(12) United States Patent
Homma et al.

(10) Patent No.: US 10,464,434 B2
(45) Date of Patent: Nov. 5, 2019

(54) ENERGY STORAGE SYSTEM, TRANSPORTATION UNIT, AND METHOD OF CONTROLLING ENERGY STORAGE SYSTEM

(71) Applicant: HONDA MOTOR CO., LTD., Tokyo (JP)

(72) Inventors: Keiichiro Homma, Wako (JP); Jun Kudo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 15/820,434

(22) Filed: Nov. 22, 2017

(65) Prior Publication Data

US 2018/0154790 A1  Jun. 7, 2018

(30) Foreign Application Priority Data

Dec. 2, 2016  (JP) .................................. 2016-234692

(51) Int. Cl.
*H02J 7/00* (2006.01)
*B60L 11/18* (2006.01)
(Continued)

(52) U.S. Cl.
CPC ........... *B60L 11/1838* (2013.01); *B60L 53/14* (2019.02); *B60L 53/60* (2019.02); *B60L 53/63* (2019.02); *B60L 53/64* (2019.02); *B60L 55/00* (2019.02); *B60L 58/12* (2019.02); *H02J 3/32* (2013.01); *H02J 7/022* (2013.01); *H02J 7/042* (2013.01); *H02J 13/0006* (2013.01);
(Continued)

(58) Field of Classification Search
CPC ............... Y02T 10/7005; Y02T 90/128; Y02T 10/7088; Y02T 90/163
USPC .......................................................... 320/109
See application file for complete search history.

(56) References Cited

U.S. PATENT DOCUMENTS 6,771,045 B1 * 8/2004 Keller ................. H01M 10/441
320/118
7,723,955 B2 * 5/2010 Zaag ..................... H02J 7/0019
320/109
(Continued)

FOREIGN PATENT DOCUMENTS

JP          5440158 B2      7/2011

*Primary Examiner* — Arun C Williams
(74) *Attorney, Agent, or Firm* — Mori & Ward, LLP

(57) ABSTRACT

An energy storage system includes an energy storage provided in a transportation unit, a connector electrically connectable to an external power transmission management apparatus, a power transmission circuit, and a processor. The processor is configured to control the power transmission circuit in accordance with an output from the external power transmission management apparatus to perform power transmission between the energy storage and an external power system, and control the power transmission circuit in accordance with an output from the external power transmission management apparatus, if a degree of variation in charging states in the energy storage and one or more external energy storages is greater than or equal to a threshold value, to perform power transmission between the energy storage and the one or more external energy storages to reduce the degree of variation before performing the power transmission between the energy storage and the external power system.

24 Claims, 8 Drawing Sheets

(51) Int. Cl.

| | |
|---|---|
| *H02J 7/02* | (2016.01) |
| *H02J 3/32* | (2006.01) |
| *H02J 7/04* | (2006.01) |
| *H02J 13/00* | (2006.01) |
| *B60L 53/14* | (2019.01) |
| *B60L 53/60* | (2019.01) |
| *B60L 53/64* | (2019.01) |
| *B60L 55/00* | (2019.01) |
| *B60L 53/63* | (2019.01) |
| *B60L 58/12* | (2019.01) |

(52) U.S. Cl.
CPC ....... *B60L 2240/80* (2013.01); *B60L 2260/58* (2013.01); *H02J 13/002* (2013.01); *H02J 13/0062* (2013.01); *H02J 13/0075* (2013.01); *H02J 13/0079* (2013.01); *Y02E 60/722* (2013.01); *Y04S 10/14* (2013.01)

(56) References Cited

U.S. PATENT DOCUMENTS

| | | | |
|---|---|---|---|
| 2005/0029033 A1* | 2/2005 | Rip | B62H 5/20 180/220 |
| 2006/0022639 A1* | 2/2006 | Moore | H02J 7/0016 320/116 |
| 2010/0194354 A1* | 8/2010 | Gotou | H02H 3/33 320/163 |
| 2011/0248683 A1* | 10/2011 | Young | B60L 11/005 320/137 |
| 2012/0098543 A1* | 4/2012 | Rutkowski | H01M 2/1077 324/435 |
| 2012/0194135 A1* | 8/2012 | Mizoguchi | H02J 7/0016 320/118 |
| 2014/0327408 A1* | 11/2014 | Ishii | B60L 11/123 320/135 |
| 2015/0008886 A1* | 1/2015 | Kim | B60L 11/1866 320/136 |
| 2017/0106764 A1* | 4/2017 | Beaston | B60L 11/1816 |

* cited by examiner

· Aa: INCENTIVE OF DISCHARGE BY SOC VARIATION REDUCTION PROCESSING
· Ba, Bb, Bc, Bd: INCENTIVE OF INSTANTANEOUS RESERVED POWER TRANSMISSION OPERATION
· Ca, Cb, Cc, Cd: INCENTIVE OF FREQUENCY ADJUSTMENT OPERATION
· A'c, A'd: PAYMENT COST BY CHARGE IN VARIATION REDUCTION PROCESSING
· Da, Db, Dc, Dd: PAYMENT COST BY CHARGE

ENERGY STORAGE SYSTEM, TRANSPORTATION UNIT, AND METHOD OF CONTROLLING ENERGY STORAGE SYSTEM

CROSS-REFERENCE TO RELATED APPLICATIONS

The present application claims priority under 35 U.S.C. § 119 to Japanese Patent Application No. 2016-234692, filed Dec. 2, 2016, entitled "Energy Storage System, Transportation Unit, and Method of Controlling The Energy Storage System." The contents of this application are incorporated herein by reference in their entirety.

BACKGROUND

1. Field

The present disclosure relates to an energy storage system, a transportation unit, and a method of controlling an energy storage system.

2. Description of the Related Art

For instance, as described in Japanese Patent No. 5440158, a technique has been proposed which charges an energy storage having a small amount of stored energy by transmitting power from a vehicle including an energy storage having a large amount of stored energy to a vehicle including the energy storage having a small amount of stored energy out of multiple vehicles in order to avoid a situation (eventually, to protect against acceleration of deterioration of the energy storages) in which respective energy storages of the multiple vehicles are left in a state where the amounts of stored energy of the energy storages are excessively low or excessively high for a long time.

SUMMARY

According to one aspect of the present invention, an energy storage system of the present disclosure includes: an energy storage mounted in a transportation unit; a connector that is electrically connectable to an external power transmission management apparatus, and that, in a connected state, allows power transmission, via the power transmission management apparatus, between an external power system electrically connected to the power transmission management apparatus, and one or more external energy storages electrically connected to the power transmission management apparatus; a power transmission circuit interposed between the connector and the energy storage; a controller that has a function of controlling the power transmission circuit. The controller has a function that, in a state where the connector is electrically connected to the power transmission management apparatus, performs A control processing to control the power transmission circuit in accordance with a command issued from the power transmission management apparatus so that power transmission is performed between the energy storage and the power system, and a function that, when a degree of variation in states of charge of a plurality of energy storages including the energy storage and the one or more external energy storages is greater than or equal to a predetermined threshold value, performs B control processing to control the power transmission circuit before the A control processing is performed to reduce the degree of variation, in accordance with a command issued from the power transmission management apparatus so that power transmission is performed between the energy storage and the one or more external energy storages via the power transmission management apparatus (a first aspect of the disclosure).

According to another aspect of the present invention, a method of controlling an energy storage system in the present disclosure including: an energy storage mounted in a transportation unit, a connector that is electrically connectable to an external power transmission management apparatus, and that, in a connected state, allows power transmission, via the power transmission management apparatus, between an external power system electrically connected to the power transmission management apparatus, and one or more external energy storages electrically connected to the power transmission management apparatus, and a power transmission circuit interposed between the connector and the energy storage, the method including: in a state where the connector is electrically connected to the power transmission management apparatus, controlling the power transmission circuit to perform power transmission between the energy storage and the power system, and when a degree of variation in states of charge of a plurality of energy storages including the energy storage and the one or more external energy storages is greater than or equal to a predetermined threshold value, to reduce the degree of variation before the controlling the power transmission circuit, controlling the power transmission circuit to perform power transmission between the energy storage and the one or more external energy storages via the power transmission management apparatus (12th aspect of the disclosure).

According to further aspect of the present invention, an energy storage system includes an energy storage provided in a transportation unit, a connector electrically connectable to an external power transmission management apparatus that is electrically connectable to an external power system and one or more external energy storages, a power transmission circuit interposed between the connector and the energy storage, and a processor. The processor is configured to control the power transmission circuit in accordance with an output from the external power transmission management apparatus to perform power transmission between the energy storage and the external power system, and control the power transmission circuit in accordance with an output from the external power transmission management apparatus, if a degree of variation in charging states in the energy storage and the one or more external energy storages is greater than or equal to a threshold value, to perform power transmission between the energy storage and the one or more external energy storages via the external power transmission management apparatus to reduce the degree of variation before performing the power transmission between the energy storage and the external power system.

According to further aspect of the present invention, a method of controlling an energy storage system is disclosed. The method includes controlling a power transmission circuit to perform power transmission between an energy storage and an external power system, the energy storage system including the energy storage provided in a transportation unit, the connector electrically connectable to the external power transmission management apparatus that is electrically connectable to the external power system and one or more external energy storages, and the power transmission circuit interposed between the connector and the energy storage, and if a degree of variation in states of charge of the energy storage and the one or more external energy storages is greater than or equal to a threshold value, controlling the power transmission circuit to perform power transmission between the energy storage and the one or more external energy storages via the power transmission management apparatus to reduce the degree of variation before performing the power transmission between the energy storage and the external power system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
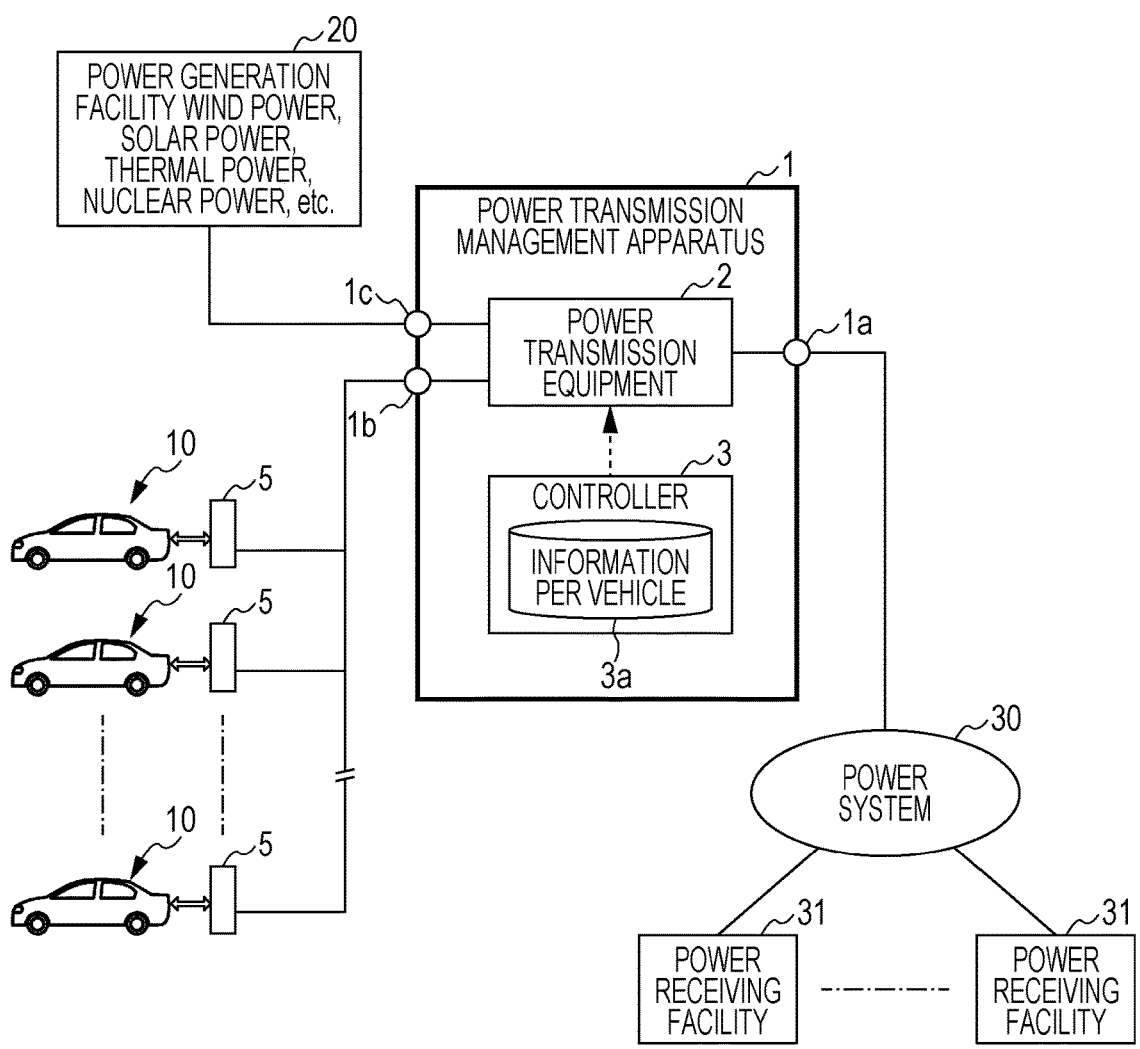
FIG. 1 a diagram illustrating the entire configuration of a system including a vehicle (transportation unit) equipped with a power storage system in an embodiment of the present disclosure.

The embodiments will now be described with reference to the accompanying drawings, wherein like reference numerals designate corresponding or identical elements throughout the various drawings.

An embodiment of the present disclosure will be described below with reference to FIGS. 1 to 8. Referring to FIG. 1, the entire system described in this embodiment is an example of so-called a vehicle to grid (V2G) system, and includes power transmission management apparatus 1, multiple vehicles 10, 10, . . . as transportation units, a power generation facility 20, and a power system 30.

The power generation facilities 20 is formed by facility of wind power generation, solar power generation, thermal power generation, and nuclear power generation, for instance. The power generation facilities 20 is electrically connected to a connector 1c of the power transmission management apparatus 1 so that power can be supplied to the power transmission management apparatus 1.

It is to be noted that "an any object A (or facility A) is "electrically connected" to another object B (or facility B)" in description of this embodiment indicates a state where power can be transmitted between A and B at any time (an electric line between A and B is formed). In this case, "electrical connection" between A and B is not limited to a connection state due to contact between conductors, and may be a connection state where power transmission between A and B is performed wirelessly (via electromagnetic wave energy).

The power system 30 is a facility (transmission network) that supplies power to power receiving facilities 31, 31, . . . of multiple power consumers. The power system 30 is electrically connected to a connector 1a of the power transmission management apparatus 1 so that power can be transmitted between the power transmission management apparatus 1 and the power system 30.

Figure 2:
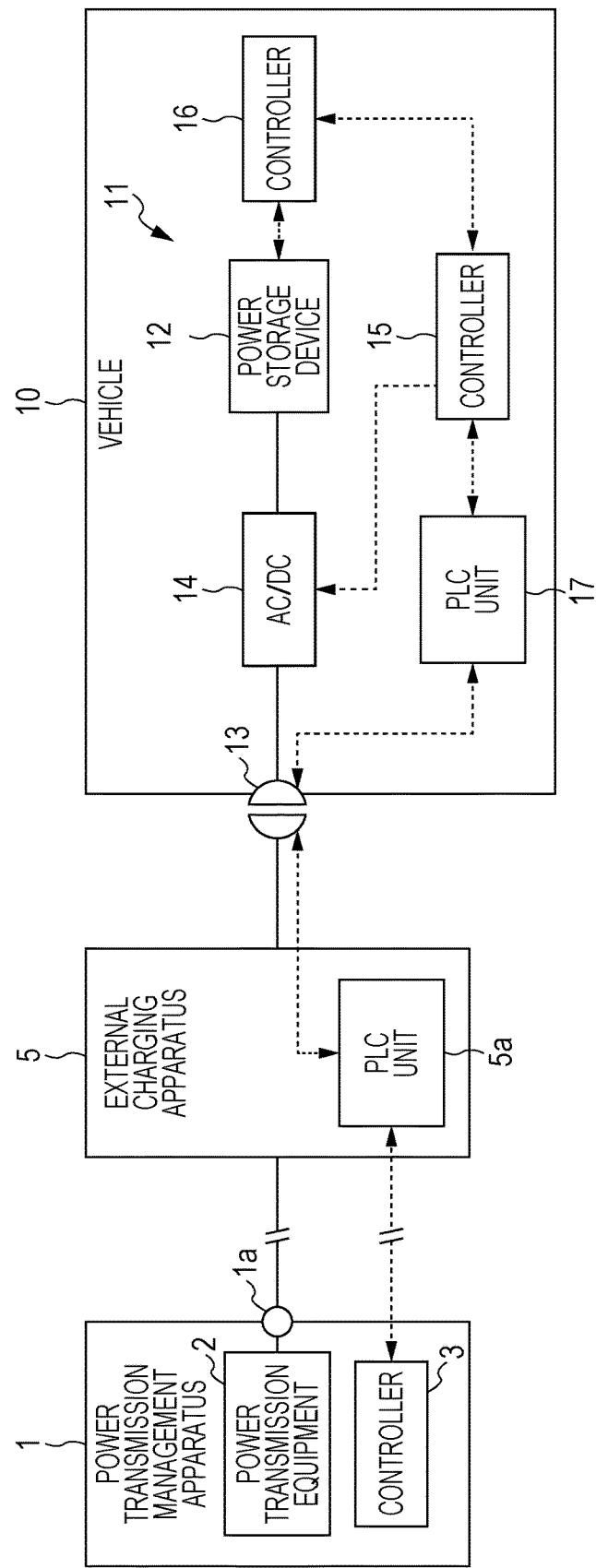
FIG. 2 is a block diagram illustrating the configuration of power transmission between a power transmission management apparatus and a vehicle.

As illustrated in FIG. 2, each vehicle 10 is a vehicle (for instance, an electric vehicle or a hybrid vehicle) that is equipped with an energy storage 12 having a relatively high capacity. The energy storage 12 is formed as an aggregate of multiple cells including a secondary battery such as a lithium ion battery, or a capacitor, for instance.

Each vehicle 10 is pre-registered in the power transmission management apparatus 1 as a vehicle that is capable of transmitting power (charge power or discharge power of the energy storage 12) between the energy storage 12 and the power transmission management apparatus 1.

It is to be noted that in this embodiment, the energy storage 12 of any one vehicle 10 of the multiple vehicles 10 corresponds to the energy storage (mounted energy storage) mounted in the transportation unit in the present disclosure, and the energy storage 12 of another vehicle 10 corresponds to the external energy storage in the present disclosure.

The energy storage 12 of each vehicle 10 is electrically connected to an external charging apparatus 5 installed in a parking lot of the vehicle 10, and thus the energy storage 12 is electrically connected to a connector 1b of the power transmission management apparatus 1 via the external charging apparatus 5.

More particularly, each vehicle 10 is equipped with a power storage system 11 including equipment for performing power transmission between the energy storage 12 and the external charging apparatus 5. In addition to the energy storage 12, the power storage system 11 includes a connector 13 that is electrically connectable to the external charging apparatus 5, an AC-DC converter 14 serving as a power transmission equipment that performs power transmission between the energy storage 12 and the connector 13, a controller 15 that controls power transmission between the external charging apparatus 5 and the energy storage 12 via the AC-DC converter 14, a controller 16 that performs control processing related to monitoring and management of the state of the energy storage 12, and a power line communication (PLC) unit 17 for power line communication between the external charging apparatus 5 and the vehicle 10. It is to be noted that the connector 13 corresponds to the connector in the present disclosure, the AC-DC converter 14 corresponds to the power transmission circuit in the present disclosure, and the controller 15 corresponds to the controller in the present disclosure.

Here, the external charging apparatus 5 is a terminal that relays power transmission between the power transmission management apparatus 1 and the vehicle 10 in a state electrically connected to the connector 13 of the vehicle 10. The external charging apparatus 5 is electrically connected to the connector 1b of the power transmission management apparatus 1 so that power can be transmitted between the power transmission management apparatus 1 and the external charging apparatus 5.

In a state where the external charging apparatus 5 is electrically connected to the connector 13 of the vehicle 10, the external charging apparatus 5 can receive the power to be charged to the energy storage 12 of the vehicle 10 from the power transmission management apparatus 1, or can receive discharge power of the energy storage 12 from the vehicle 10, and can transmit the power to the power transmission management apparatus 1. Therefore, the external charging apparatus 5 is electrically connected to the connector 13, and consequently the energy storage 12 of each vehicle 10 is electrically connected to the connector 1b of the power transmission management apparatus 1 via the external charging apparatus 5.

It is to be noted that in this embodiment, the power transmitted between the external charging apparatus 5 and the vehicle 10 is the AC power.

Also, the external charging apparatus 5 is equipped with a PLC unit 5a that performs power line communication between the PLC units 17 of the vehicle 10. The PLC unit 5a can communicate with the later-described controller 3 of the power transmission management apparatus 1 via a communication network such as the Internet. Consequently, communication is possible between the vehicle 10 and the power transmission management apparatus 1 via the PLC units 5a, 17.

The AC-DC converter 14 is an electronic device that is capable of converting power from one of AC power and DC power to the other by the control by the controller 15. The power storage system 11 is controlled so that when power is transmitted from the external charging apparatus 5 to the energy storage 12 (when the energy storage 12 is charged), the AC-DC converter 14 converts AC power inputted from the external charging apparatus 5 via the connector 13 to DC power, and supplies the DC power to the energy storage 12.

The power storage system 11 is controlled so that when power is transmitted from the energy storage 12 to the external charging apparatus 5 (when the energy storage 12 is discharged), the AC-DC converter 14 converts DC power inputted from the energy storage 12 to AC power, and supplies the AC power to the external charging apparatus 5.

It is to be noted that the AC-DC converter 14 is configured to variably control the amount of transmission of power between the external charging apparatus 5 and the energy storage 12.

The controllers 15, 16 are formed of one or multiple electronic circuit units including a CPU, a RAM, a ROM, an interface circuit. As the functions achieved by implemented hardware configuration or programs (software configuration), the controller 15 has a function of controlling the AC-DC converter 14, a function of communicating with the external charging apparatus 5 or the power transmission management apparatus 1 via the PLC unit 17, and a function of communicating with the controller 16.

In this case, the controller 15 can obtain data such as a state of charge (SOC), a temperature of the energy storage 12, indicating a state of the energy storage 12 by the communication with the controller 16.

Furthermore, the controller 15 can receive a command related to discharge or charge of the energy storage 12 by the communication with the external charging apparatus 5 from the power transmission management apparatus 1 via the external charging apparatus 5, or can transmit the data indicating the state of charge (hereinafter referred to as the SOC) of the energy storage 12 to the power transmission management apparatus 1 via the external charging apparatus 5.

The controller 16 receives input of detection data indicating the voltage, current, and temperature of the energy storage 12 from a sensor which is not illustrated. As the functions achieved by implemented hardware configuration or programs (software configuration), the controller 16 has a function of sequentially estimating an SOC of the energy storage 12 based on the inputted detection data, and a function of communicating with the controller 15.

As a supplement, communication between the external charging apparatus 5 and the vehicle 10 may be performed by a communication system other than PLC (for instance, wireless communication such as Wi-Fi (registered trademark) or Bluetooth (registered trademark), or a wired communication using a signal line for communication).

Also, the controller 15 of the vehicle 10 may be configured to directly communicate with the power transmission management apparatus 1 via a communication networks such as the Internet. Also, the controllers 15, 16 of the vehicle 10 may be collectively formed as a single electronic circuit unit.

Also, the external charging apparatus 5 and the power storage system 11 may be configured to perform power transmission between the external charging apparatus 5 and the vehicle 10 by DC power. In this case, the power storage system 11 may include, for instance, a DC-DC converter as a power transmission equipment that works between the energy storage 12 and the connector 13.

As illustrated in FIG. 1, the power transmission management apparatus 1 includes a power transmission equipment 2 that transmits power between the connectors 1a, 1b, 1c, and the power transmission equipment 2, and a controller 3 that controls the power transmission equipment 2.

The power transmission equipment 2 includes, for instance, multiple switches and electrical relays. Also, the controller 3 is formed of one or more electronic circuit units including a CPU, a RAM, a ROM, an interface circuit, or one or more computers, or a combination of these electronic circuit units and computers. It is to be noted that the components of each of the power transmission equipment 2 and the controller 3 may be distributed over multiple portions.

The controller 3 has a function of controlling the power transmission equipment 2 by implemented hardware configuration or programs (software configuration). In this case, the controller 3 is capable of controlling on/off of an electric line for performing power transmission between the connectors 1a, 1b, and 1c, and of controlling on/off of an electric line for performing power transmission between the energy storages 12 of multiple vehicles 10 electrically connected to the connector 1b.

The power transmission management apparatus 1 is capable of transmitting power from the connector 1b or 1c to the connector 1a so that the power received from the energy storage 12 of each vehicle 10 or the power generation facilities 20 is supplied to the power system 30 by controlling the power transmission equipment 2 using the controller 3 as appropriate, or of transmitting the power received from the power generation facilities 20 or the power system 30 to the energy storage 12 of each vehicle 10 from the connector 1a or 1c via the connector 1b so that the energy storage 12 of each vehicle 10 is charged, or of transmitting power between the respective energy storages 12 of multiple vehicles 10, 10, . . . (in other words, supplying the power received from the energy storage 12 of one vehicle 10 to the energy storage 12 of another vehicle 10).

In this case, power transmission between the power transmission management apparatus 1 and the power system 30 is performed in accordance with the contract made between a business operator of the power transmission management apparatus 1 and a business operator of the power system 30.

Figure 3A:
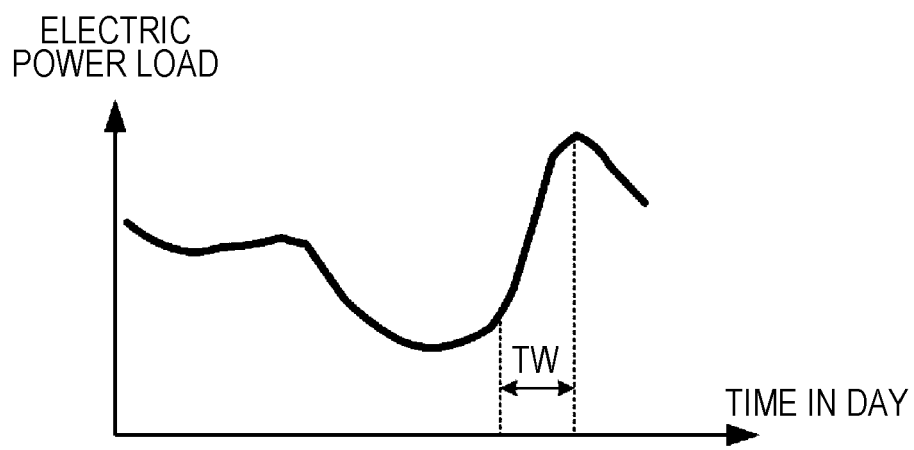
FIGS. 3A and 3B are graphs for explaining the power transmission between a power transmission management apparatus and a power system.

For instance, as illustrated by the graph of FIG. 3A, in a time period TW (contracted time period) in which the power load of the power system 30 is predicted to increase rapidly during a day, power having a predetermined amount of power, contracted as so-called an instantaneous reserve power is supplied from the power transmission management apparatus 1 to the power system 30.

It is to be noted that more particularly, "electric power load" for the vertical axis in the graph of FIG. 3A is the amount of power obtained by subtracting the entire amount of power supplied to the power system 30 for regular use from the entire requested amount of power to the power system 30.

Hereinafter, supplying power as an instantaneous reserve power from the power transmission management apparatus 1 to the power system 30 as described above is referred to as instantaneous reserved power transmission processing. In the instantaneous reserved power transmission processing, the power transmission management apparatus 1 basically transmits the total amount of power received from the respective energy storages 12 of the multiple vehicles 10, 10, . . . to the power system 30. In this case, the amount of power to be transmitted to the power system 30 and an execution time period for the instantaneous reserved power transmission processing are contracted.

Figure 3B:
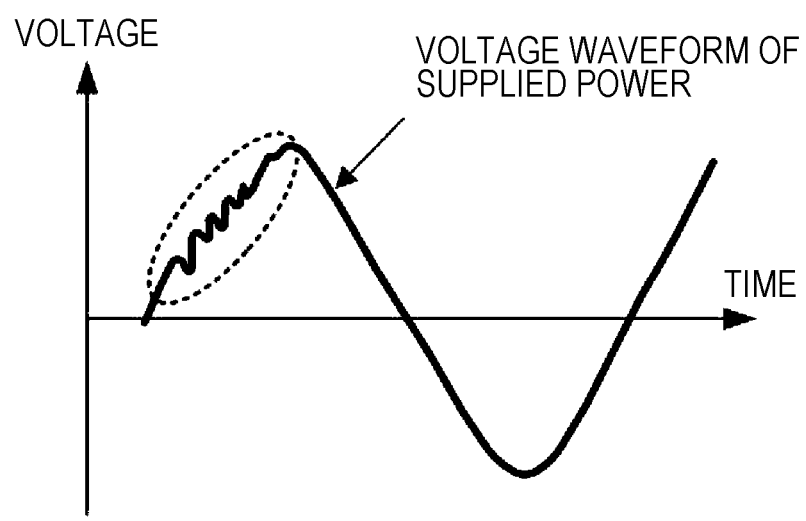

Also, as illustrated by a dashed line portion of the graph of FIG. 3B, in a situation in which the waveform of power supplied to each power receiving facility 31 by the power system 30 includes a fluctuation component with a frequency higher than a reference frequency, power transmission from the power transmission management apparatus 1 to the power system 30, and power transmission from the power system 30 to the power transmission management apparatus 1 are alternately repeated in a relatively short period so that the fluctuation component is reduced (eventually, distortion of the power waveform is reduced).

Hereinafter, giving and receiving power between the power transmission management apparatus 1 and the power system 30 as described above is referred to as frequency adjustment processing. In the frequency adjustment processing, the power transmission management apparatus 1 basically transmits the total amount of power received from the respective energy storages 12 of the multiple vehicles 10, 10, . . . to the power system 30 at the time of power transmission to the power system 30, and distributes and supplies received power to the respective energy storages 12 of the multiple vehicles 10, 10, . . . at the time of power reception from the power system 30. Therefore, in the frequency adjustment processing, charge and discharge of the respective energy storages 12 of the multiple vehicles 10, 10, . . . are periodically repeated. In this case, the amount of transmission of power (the amount of transmitted power and the amount of received power) per period between the power transmission management apparatus 1 and the power system 30, and an execution time period for the frequency adjustment processing are contracted.

It is to be noted that the above-mentioned contract information (the amount of electricity transmitted and the execution time period in the instantaneous reserved power transmission processing, and the amount of transmission of power per period and the execution time period in the frequency adjustment processing) on the instantaneous reserved power transmission processing and the frequency adjustment processing is inputted to the controller 3 via an input device (not illustrated) or from another computer, and is recorded and held.

Also, the controller 3 of the power transmission management apparatus 1 includes a recorder 3a (database) that records each pre-registered vehicle 10 as the vehicle 10 that can perform power transmission between the power transmission management apparatus 1 and the vehicle 10, and information (hereinafter simply referred to as vehicle-to-vehicle information) on the user of each vehicle 10. The vehicle-to-vehicle information includes for instance, information (such as a mail address) indicating a destination of transmission of various data to each vehicle 10 or a user, information on incentive to the user of each vehicle 10, information indicating payment cost (bearing cost) to the user of each vehicle 10, and history information on power transmission between each vehicle 10 and the power transmission management apparatus 1.

Here, in this embodiment, when power transmission is performed between the energy storage 12 of each vehicle 10 and the power transmission management apparatus 1 by the instantaneous reserved power transmission processing or the frequency adjustment processing, incentive such as money or points is given to the user of the vehicle 10 by a business operator of the power transmission management apparatus 1 for each processing.

Also, in this embodiment, power is transmitted (given and received) between the respective energy storages 12 of the multiple vehicles 10, 10, . . . by the later-described SOC variation reduction processing. In this case, an incentive (positive incentive) is given to the user of a vehicle 10, who has discharged the energy storage 12, whereas bearing of cost (negative incentive) is imposed on the user of a vehicle 10, who has charged the energy storage 12.

The above-mentioned incentive information recorded on the recorder 3a includes, for instance, information indicating the value of incentive (cumulative incentive value) acquired by the user of each vehicle 10, and information indicating an acquisition history and a usage history of incentive. It is to be noted that when the user of each vehicle 10 consumes an incentive as needed, the cumulative incentive value of the user is decreased by an amount corresponding to the consumption.

Also, when the user charges the energy storage 12 of each vehicle 10 up to a desired amount, the payment cost is the cost to be paid by a user according to the amount of charge.

The controller 3 can transmit the above-mentioned incentive information on the payment cost to each vehicle 10 as needed, or to a terminal such as a smartphone, a tablet terminal, and a personal computer used by the user of each vehicle 10.

As a supplement, the energy storages 12 of multiple vehicles 10 and another power supply source (for instance, a stationary large-capacity energy storage) different from the power generation facilities 20 may be electrically connected to the power transmission management apparatus 1.

Next, the operation (particularly, the operation related to the power transmission of the power transmission management apparatus 1 and the energy storage 12 of each vehicle 10) of the system in this embodiment will be described below.

When the user of each vehicle 10 parks the vehicle 10 in a parking lot in which the external charging apparatus 5 is utilizable, the external charging apparatus 5 is electrically connected to the connector 13 of the vehicle 10 by the user. Thus, the energy storage 12 of the vehicle 10 is electrically connected to the connector 1b of the power transmission management apparatus 1 via the external charging apparatus 5.

In a time period before power transmission between the power transmission management apparatus 1 and the power system 30 is performed by the instantaneous reserved power transmission processing or the frequency adjustment processing, the controller 3 of the power transmission management apparatus 1 performs control processing (hereinafter referred to as SOC variation reduction processing), in cooperation with the controller 15 of each vehicle 10, for reducing a variation in the SOC, as much as possible, of the respective energy storages 12 of the multiple vehicles 10, 10, . . . electrically connected to the connector 1*b* via the external charging apparatus 5. It is to be noted that the processing performed by the controller 15 of each vehicle 10 out of the SOC variation reduction processing corresponds to the B control processing in the present disclosure.

In this case, when starting the SOC variation reduction processing, for all the vehicles 10 electrically connected to the power transmission management apparatus 1, the controller 3 of the power transmission management apparatus 1 transmits data indicating start of execution of the SOC variation reduction processing to the PLC unit 17 of each vehicle 10 via the PLC unit 5*a* of the external charging apparatus 5 electrically connected to the connector 13 of each vehicle 10.

At this point, the PLC unit 17 of each vehicle 10 which has received the data activates the controllers 15, 16 of the vehicle 10. More specifically, the PLC unit 17 of each vehicle 10 supplies power source to the controller 15, 16, for instance, by controlling the power source circuit (not illustrated) of the controllers 15, 16 of the vehicle 10. Thus, the controllers 15, 16 are activated.

Figure 4:
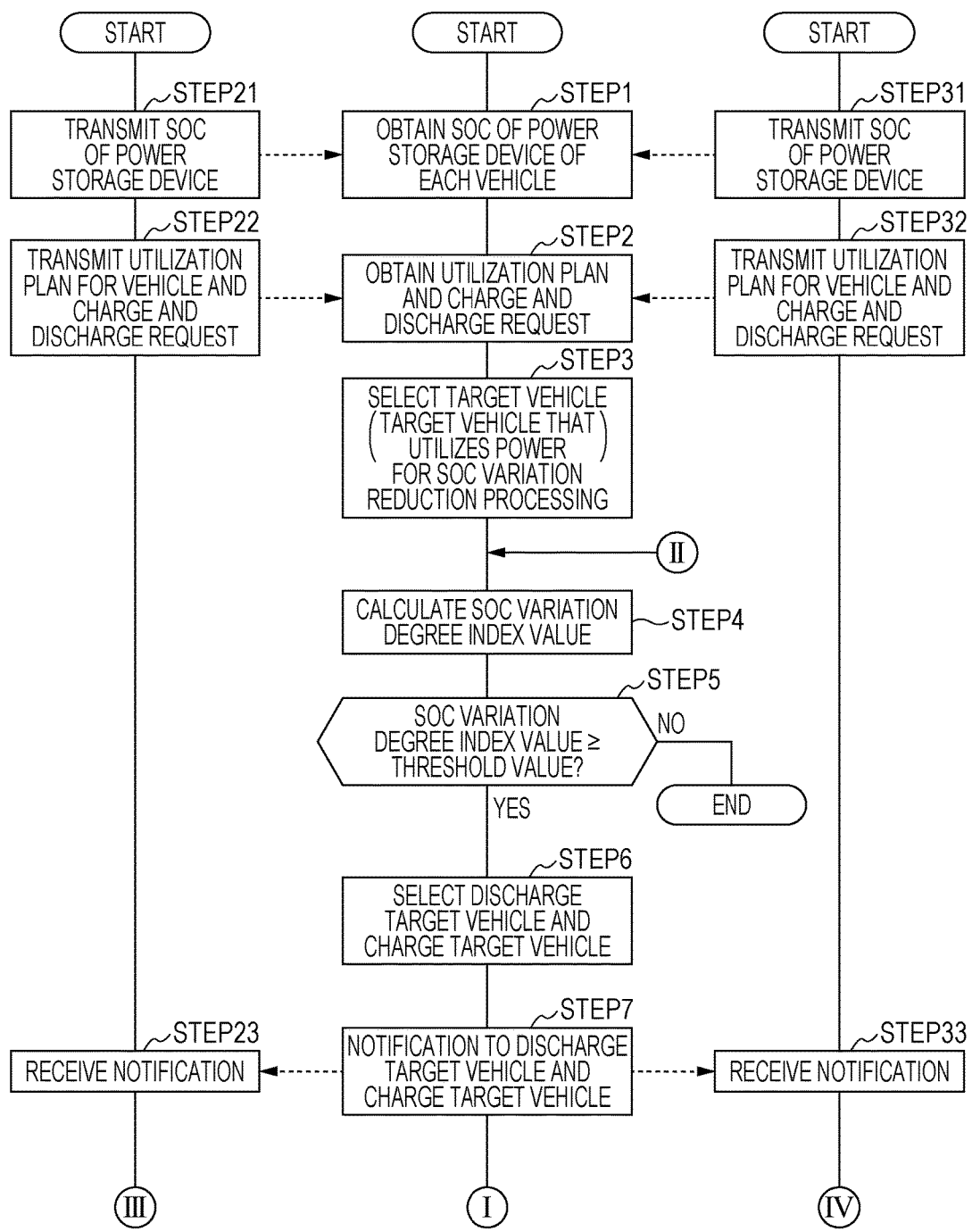
FIG. 4 is a flowchart illustrating the control processing (SOC variation reduction processing) of a power transmission management apparatus and a vehicle.
Figure 5:
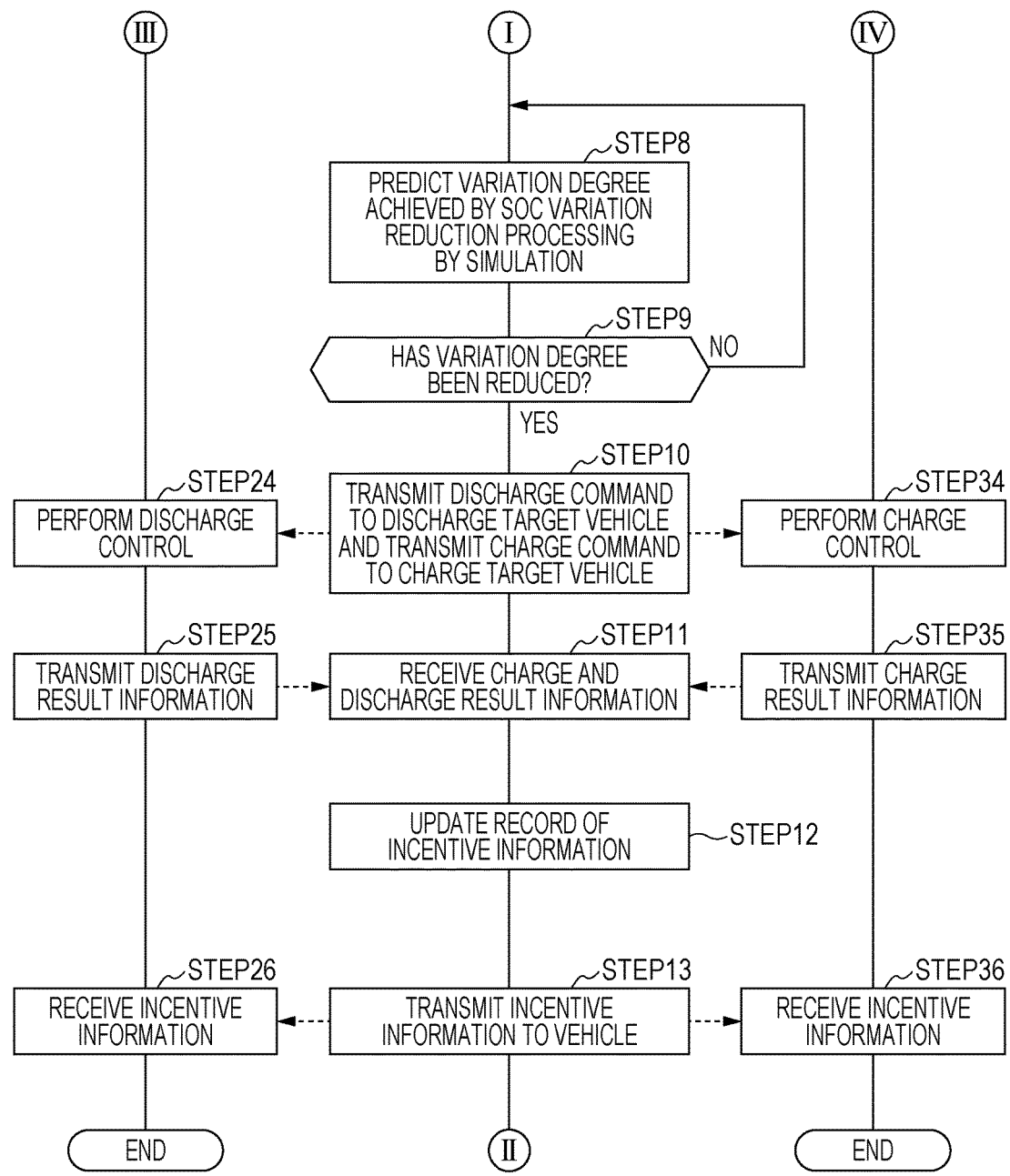
FIG. 5 is a flowchart illustrating the control processing (SOC variation reduction processing) of a power transmission management apparatus and a vehicle.

After the controllers 15, 16 of each vehicle 10 are activated in this manner, the SOC variation reduction processing is performed as illustrated in the flowchart of FIGS. 4 and 5.

It is to be noted that in FIGS. 4 and 5, the processing (the processing in STEPS 1 to 13) in the center flowchart indicates the processing performed by the controller 3 of the power transmission management apparatus 1, the processing (the processing in STEPS 21 to 26) in the left flowchart indicates the processing performed by the controller 15 of the vehicle 10 equipped with the energy storage 12 that performs discharge in the SOC variation reduction processing, and the processing (the processing in STEPS 31 to 36) in the right flowchart indicates the processing performed by the controller 15 of the vehicle 10 equipped with the energy storage 12 that performs charge in the SOC variation reduction processing.

However, the processing in STEP 21, 31 and the processing in STEP 22, 32 are performed by all the vehicles 10 electrically connected to the power transmission management apparatus 1.

In STEP 21, 31, the controller 15 of each vehicle 10 transmits data, obtained from the controller 16 and indicating the current SOC (estimated value) of the energy storage 12, addressed to the power transmission management apparatus 1 via the PLC unit 17. The data is received by the PLC unit 5*a* of the external charging apparatus 5, then is transmitted from the PLC unit 5*a* to the controller 3 of the power transmission management apparatus 1.

The transmission data is received by the controller 3 of the power transmission management apparatus 1. Thus, the controller 3 obtains the SOC of the energy storage 12 of each vehicle 10 (STEP 1).

In STEP 22, 32, the controller 15 of each vehicle 10 transmits data indicating a utilization plan of the vehicle 10 and data indicating a request (charge/discharge request) for charge/discharge of the energy storage 12 to the power transmission management apparatus 1 via the PLC unit 17. These pieces of data are received by the PLC unit 5*a* of the external charging apparatus 5, then is transmitted from the PLC unit 5*a* to the controller 3 of the power transmission management apparatus 1.

The above-mentioned data indicating a utilization plan includes, for instance, data indicating the next timing of start of use of the vehicle 10 (or data indicating a non-use time period of the vehicle 10). Also, the above-mentioned data indicating a request for charge/discharge includes, for instance, data indicating whether or not charge/discharge of the energy storage 12 by the instantaneous reserved power transmission processing or the frequency adjustment processing is permitted, and data indicating a target SOC (or a target value for increased amount of SOC) of the energy storage 12 necessary until the vehicle 10 is used next time.

The utilization plan and the charge/discharge request are, for instance, the information set by operating a predetermined operation section of the vehicle 10 by the user of each vehicle 10 when the vehicle 10 is parked.

As a supplement, the external charging apparatus 5 may be configured so that the utilization plan and the charge/discharge request are settable, for instance, by a predetermined operation of the external charging apparatus 5, and data indicating the utilization plan and the charge/discharge request may be transmitted from the external charging apparatus 5 to the power transmission management apparatus 1.

Also, for instance, when a terminal such as a smartphone owned by the user of each vehicle 10 is capable of communicating with the controller 3 of the power transmission management apparatus 1, the data indicating the utilization plan and the charge/discharge request set by the user may be transmitted from the terminal to the power transmission management apparatus 1 by the terminal.

The data indicating the utilization plan and the charge/discharge request of each vehicle 10 is received by the controller 3 of the power transmission management apparatus 1. Thus, the controller 3 obtains the utilization plan and the charge/discharge request set for each vehicle 10 (STEP 2).

Subsequently to obtaining the SOC of the energy storage 12 of each vehicle 10 and the utilization plan and the charge/discharge request of each vehicle 10, in STEP 3, the controller 3 of the power transmission management apparatus 1 selects target vehicles for the SOC variation reduction processing (the vehicles 10 equipped with the energy storage 12 that performs charge or discharge by the SOC variation reduction processing) from all the vehicles 10 electrically connected to the power transmission management apparatus 1.

In STEP 3, target vehicles for the SOC variation reduction processing are selected from all the vehicles 10 electrically connected to the power transmission management apparatus 1, the target vehicles excluding, for instance, the vehicle 10 for which it is specified by the charge/discharge request that charge/discharge of the energy storage 12 by the instantaneous reserved power transmission processing or the frequency adjustment processing is not permitted, and the vehicle 10 in which the remaining time, specified by the utilization plan, until the next timing of start of use of the vehicle 10 is relatively short, and it is predicted that the SOC variation reduction processing, the instantaneous reserved power transmission processing, or the frequency adjustment processing, or charge of the energy storage 12 up to a target SOC specified by the charge/discharge request is not completed in the remaining time period.

The vehicles 10 selected in STEP 3 are each such a vehicle that provides the power of the energy storage 12 to be utilized for power transmission in the instantaneous reserved power transmission processing or the frequency adjustment processing after execution of the SOC variation reduction processing, and hereinafter such a vehicle is referred to as a power utilization target vehicle 10.

Subsequently, in STEP 4, the controller 3 of the power transmission management apparatus 1 calculates an index value (hereinafter referred to as a SOC variation degree index value) indicating a degree of variation in the SOC (the SOC of each power utilization target vehicle 10 obtained in STEP 1) of the energy storage 12 of each power utilization target vehicle 10.

In this embodiment, for instance, a standard deviation of the SOC of the energy storage 12 of each of the power utilization target vehicles 10 is calculated as a SOC variation degree index value.

It is to be noted that as a SOC variation degree index value, for instance, a variance may be calculated instead of the standard deviation. Alternatively, for instance, the difference between a maximum and a minimum of the SOC of the energy storage 12 of each power utilization target vehicle 10 may be calculated as the SOC variation degree index value.

Subsequently, in STEP 5, the controller 3 of the power transmission management apparatus 1 determines whether or not the SOC variation degree index value is greater than or equal to a predetermined threshold value (whether or not the degree of variation in the SOC is high). A negative result of the determination in STEP 5 reflects a situation in which the degree of variation in the current SOC of the energy storage 12 of each power utilization target vehicle 10 is low (the SOCs of the respective energy storages 12 are the same or near values), or the degree of variation is reduced by the processing in STEP 6 to 12 described below. In this case, the controller 3 of the power transmission management apparatus 1 completes the SOC variation reduction processing.

On the other hand, an affirmative result of the determination in STEP 5 reflects a situation in which the degree of variation in the SOC is high. In this case, next, in STEP 6, in order to reduce the degree of variation in the SOC, the controller 3 of the power transmission management apparatus 1 selects discharge target vehicles 10 in which the energy storage 12 is to be discharged, and charge target vehicles 10 in which the energy storage 12 is to be charged, from the power utilization target vehicles 10 in accordance with a predetermined rule.

In STEP 6, for instance, out of all the power utilization target vehicles 10, one or more vehicles 10 in which the SOC of the energy storage 12 is a relatively high value are selected as the discharge target vehicles 10, and one or more vehicles 10 in which the SOC of the energy storage 12 is a relatively low value are selected as the charge target vehicles 10.

In this case, out of the power utilization target vehicles 10, the vehicle 10 having the highest SOC of the energy storage 12 (or any vehicle 10 in a high SOC state where the SOC is higher than or equal to a predetermined value) is included in the discharge target vehicles 10, and the vehicle 10 having the lowest SOC of the energy storage 12 (or any vehicle 10 in a low SOC state where the SOC is lower than or equal to a predetermined value) is included in the charge target vehicles 10. Also, the discharge target vehicles 10 and the charge target vehicles 10 are selected so that the number of charge target vehicles 10 is greater than the number of discharge target vehicles 10.

It is to be noted that some of the charge target vehicles 10 and the discharge target vehicles 10 may not be selected from the power utilization target vehicles 10. In other words, the total number of discharge target vehicles 10 and charge target vehicles 10 may be smaller than the total of power utilization target vehicles 10.

Subsequently, in STEP 7, the controller 3 of the power transmission management apparatus 1 transmits to each discharge target vehicle 10 notification data indicating that the discharge target vehicle 10 is selected as a discharge target vehicle, and transmits to each charge target vehicle 10 notification data indicating that the charge target vehicle 10 is selected as a charge target vehicle.

The notification data is received by respective controllers 15 of each charge subject vehicle 10 and each charge subject vehicle 10 (STEP 23, 33).

Subsequently, in STEP 8, the controller 3 of the power transmission management apparatus 1 predicts a degree of variation in SOC achieved by the SOC variation reduction processing by a simulation.

Specifically, the controller 3 uses variable parameters such as an execution time length of the SOC variation reduction processing, an amount of discharge (in other words, a discharge current value) per unit time of the energy storage 12 of each discharge target vehicle 10, and an amount of charge (in other words, a charge current value) per unit time of the energy storage 12 of each charge target vehicle 10, and temporarily sets the value of each variable parameter in a predetermined variable range.

It is to be noted that the amount of discharge of each discharge target vehicle 10 and the amount of charge of each charge target vehicle 10 are set so that the total amount (the total for all the discharge target vehicles 10) of discharge per unit time of the energy storages 12 of the discharge target vehicles 10 matches the total amount (the total for all the charge target vehicles 10) of charge per unit time of the energy storages 12 of the charge target vehicles 10.

In addition, the controller 3 simulates the change in the SOC of the energy storage 12 of each of the discharge target vehicles 10 and the charge target vehicles 10 under the assumption that SOC variation reduction processing is performed based on the precondition of the setting values of the variable parameters.

The controller 3 then calculates a SOC variation degree index value for the entire power utilization target vehicles 10 using the value of SOC (in other words, an estimated value at the time of completion of execution of the SOC variation reduction processing) of the energy storage 12 of each of the discharge target vehicles 10 and the charge target vehicles 10 obtained by the simulation. The calculation processing is performed similarly to STEP 4. Thus, the SOC variation degree index value is calculated as a predicted value of a degree of variation in the SOC after execution of the SOC variation reduction processing.

It is to be noted that in the calculation processing of the SOC variation degree index value in this case, the value obtained in STEP 1 is directly used as the value of SOC of the energy storage 12 of a vehicle 10 which is not selected as a discharge target vehicle 10 or as a charge target vehicle 10 out of the power utilization target vehicles 10.

Subsequently, in STEP 9, the controller 3 of the power transmission management apparatus 1 determines whether or not the degree of variation in the SOC predicted in STEP 8 is less than the degree of variation in the SOC calculated in STEP 4. In the determination processing, more specifically, for instance, it is determined whether or not the SOC variation degree index value (a predicted value of the degree of variation in SOC after execution of the SOC variation reduction processing) calculated in STEP 8 is reduced by a predetermined amount from the SOC variation degree index value (the variation degree of SOC when execution of the SOC variation reduction processing is started) calculated in STEP 4.

When a result of the determination in STEP 9 is negative, the controller 3 changes the values of some variable parameters, and performs the processing in STEP 8 again, then further performs the determination processing in STEP 9.

It is to be noted that when a result of the determination in STEP 9 does not become affirmative even after the processing in STEP 8 is repeated for a predetermined number of times, discharge target vehicles 10 and charge target vehicles 10 may be re-selected, and the processing in and after STEP 7 may be performed, for instance.

When a result of the determination in STEP 9 becomes affirmative, the controller 3 of the power transmission management apparatus 1 then performs the processing in STEP 10.

In STEP 10, the controller 3 transmits a discharge command to discharge the energy storage 12 of each discharge target vehicle 10 to the discharge target vehicle 10, and transmits a charge command to charge the energy storage 12 of each charge target vehicle 10 to the charge target vehicle 10.

In this case, as the data specifying the execution time length of the SOC variation reduction processing, and the amount of discharge per unit time of the energy storage 12 of each discharge target vehicle 10, the above-mentioned discharge command includes data indicating the setting value used in the simulation in STEP 8 immediately before a result of the determination in STEP 9 becomes affirmative.

Similarly, as the data specifying the execution time length of the SOC variation reduction processing, and the amount of charge per unit time of the energy storage 12 of each charge target vehicle 10, the above-mentioned charge command includes data indicating the setting value used in the simulation in STEP 8 immediately before a result of the determination in STEP 9 becomes affirmative.

The discharge command transmitted by the controller 3 of the power transmission management apparatus 1 in STEP 10 is received by the controller 15 of each discharge target vehicle 10 (STEP 24), and the charge command is received by the controller 15 of each charge target vehicle 10 (STEP 34).

After receiving the discharge command, the controller 15 of the discharge target vehicle 10 performs discharge control of the energy storage 12 in accordance with the discharge command (STEP 25). In this case, in a period with the execution time length of the SOC variation reduction processing specified by the discharge command, the controller 15 controls the AC/DC converter 14 so that the energy storage 12 of the discharge target vehicle 10 is discharged by a specified amount of discharge.

After receiving the charge command, the controller 15 of the charge target vehicle 10 performs charge control of the energy storage 12 in accordance with the charge command (STEP 35). In this case, in a period with the execution time length of the SOC variation reduction processing specified by the charge command, the controller 15 controls the AC/DC converter 14 so that the energy storage 12 of the charge target vehicle 10 is charged by a specified amount of charge.

As described above, the discharge control of the energy storage 12 of each discharge target vehicle 10 and the charge control of the energy storage 12 of each charge target vehicle 10 are performed, and thus the discharge power outputted by the energy storage 12 of each discharge target vehicle 10 is transmitted from the discharge target vehicle 10 to the power transmission management apparatus 1 via the external charging apparatus 5. The total amount of the discharge power received from the energy storage 12 of each discharge target vehicle 10 by the power transmission management apparatus 1 is distributed and supplied to the energy storage 12 of each charge target vehicle 10 from the power transmission management apparatus 1.

Consequently, the SOC of the energy storage 12 of each discharge target vehicle 10 decreases, and the SOC of the energy storage 12 of each charge target vehicle 10 increases.

In this case, in this embodiment, charge target vehicles 10 and discharge target vehicles 10 are selected so that the number of charge target vehicles 10 is greater than the number of discharge target vehicles 10. For this reason, the energy storage 12 of each charge target vehicle 10 can be charged in a state where the amount of charge per unit time (so-called charge rate) is low (in short, at a low rate).

Here, in general, when the energy storage 12 is charged at a high rate (in a state where the amount of charge per unit time is high), deterioration is likely to accelerate. However, in this embodiment, the energy storage 12 of each charge target vehicle 10 can be charged at a low rate. For this reason, acceleration of deterioration of the energy storage 12 can be suppressed as much as possible.

When completing the discharge control of each energy storage 12, next, in STEP 26, the controller 15 of the discharge target vehicle 10 transmits discharge result information to the power transmission management apparatus 1. The discharge result information indicates, for instance, the total amount of discharge (or the amount of decrease in the SOC of the energy storage 12) of the energy storage 12 of each discharge target vehicle 10 in the SOC variation reduction processing this time.

Also, when completing the charge control of each energy storage 12, next, in STEP 36, the controller 15 of the charge target vehicle 10 transmits charge result information to the power transmission management apparatus 1. The charge result information indicates, for instance, the total amount of charge (or the amount of increase in the SOC of the energy storage 12) of the energy storage 12 of each charge target vehicle 10 in the SOC variation reduction processing this time.

The discharge result information and the charge result information are received by the controller 3 of the power transmission management apparatus 1 (STEP 11).

In STEP 12, the controller 3 of the power transmission management apparatus 1 updates the incentive information recorded in the recorder 3a corresponding to each discharge target vehicle 10 based on the discharge result information received for each discharge target vehicle 10, and updates the incentive information recorded in the recorder 3a corresponding to each charge target vehicle 10 based on the charge result information received for each charge target vehicle 10.

Specifically, the cumulative incentive value for the user of each discharge target vehicle 10 is increased by an amount proportional to the total amount of discharge indicated by the discharge result information. Also, the cumulative incentive value for the user of each charge target vehicle 10 is decreased by an amount proportional to the total amount of charge indicated by the charge result information. It is to be noted that the cumulative incentive value for the user of a power utilization target vehicle 10 not selected as a discharge target vehicle 10 or a charge target vehicle 10 is maintained at the current value without being increased or decreased.

Here, an increase (in other words, incentive granted per unit discharge amount) of the incentive value per unit discharge amount of the energy storage 12 of each discharge target vehicle 10 and a decrease (in other words, payment cost imposed per unit charge amount) in the incentive value per unit charge amount of the energy storage 12 of each charge target vehicle 10 in the SOC variation reduction processing are set in advance. As an example, an increase in the incentive value per unit discharge amount and a decrease (bearing of cost) in the incentive value per unit charge amount are set to the same value, for instance.

In this case, as a consequence, an incentive is given and received between the user of the discharge target vehicle 10 and the user of the charge target vehicle 10. Therefore, a business operator of the power transmission management apparatus 1 has substantially no bearing of cost for the SOC variation reduction processing.

After the processing in STEP 12, in STEP 13, the controller 3 of the power transmission management apparatus 1 transmits incentive information indicating an incentive value after the update to each of the discharge target vehicles 10 and the charge target vehicles 10.

The incentive information is received, stored and held by the controller 15 of each of the discharge target vehicles 10 and the charge target vehicles 10 (STEP 26, 36).

The user of the vehicle 10 is informed of the incentive information by visual display with a display unit or by voice at the time of start of next operation of each of the discharge target vehicles 10 and the charge target vehicles 10.

It is to be noted that the incentive information may be transmitted from the power transmission management apparatus 1 addressed to a terminal such as a smartphone owned by the user of each of the discharge target vehicles 10 and the charge target vehicles 10.

After transmitting the incentive information, the controller 3 of the power transmission management apparatus 1 performs the processing in and after STEP 4 again. In the processing (processing of calculating a SOC variation degree index value) in STEP 4 in this case, an estimated value after discharge by the discharge control is used as the value of SOC of the energy storage 12 of each discharge target vehicle 10, and an estimated value after charge by the charge control is used as the value of SOC of the energy storage 12 of each charge target vehicle 10.

Here, a result of the determination in STEP 5 subsequent to STEP 4 basically indicates negative due to the discharge control of the energy storage 12 of each discharge target vehicle 10 and the charge control of the energy storage 12 of each charge target vehicle 10. Thus, the SOC variation reduction processing is completed.

However, depending on a combination of discharge target vehicles 10 and charge target vehicles 10 out of the power utilization target vehicles 10 or on the setting values of the variable parameters used by the discharge control and the charge control, reduction in the degree of variation in the SOC is insufficient, and eventually, a result of the determination in STEP 5 may be affirmative. In this case, the processing in and after STEP6 is performed again.

In this embodiment, the SOC variation reduction processing is performed as described above.

After performing the SOC variation reduction processing, the controller 3 of the power transmission management apparatus 1 performs the instantaneous reserved power transmission processing or the frequency adjustment processing in cooperation with the controller 15 of each of the power utilization target vehicles 10 in a predetermined time period. It is to be noted that the processing performed by the controller 15 of each vehicle 10 out of the instantaneous reserved power transmission processing or the frequency adjustment processing corresponds to the first control processing in the present disclosure.

In this case, in a time period in which the instantaneous reserved power transmission processing is performed, for instance, out of the power utilization target vehicles 10, a vehicle 10, in which the SOC of the energy storage 12 is higher than or equal to a predetermined lower limit threshold value (for instance, 10%), is selected as a vehicle that serves as a power supply source. It is to be noted that the lower limit threshold value corresponds to the first threshold value in the present disclosure.

Then power is supplied from the energy storage 12 of each of selected vehicles 10 to the power transmission management apparatus 1 via the external charging apparatus 5, and the total amount of power is transmitted from the power transmission management apparatus 1 to the power system 30.

In this case, discharge of the energy storage 12 of each selected vehicle 10 is performed in a range in which the SOC of the energy storage 12 is maintained to be higher than or equal to the predetermined lower limit threshold value.

Also, in a time period in which the frequency adjustment processing is performed, for instance, out of the power utilization target vehicles 10, a vehicle 10, in which the SOC of the energy storage 12 is lower than or equal to a predetermined upper limit threshold value (for instance, 90%) and higher than or equal to the predetermined lower limit threshold value, is selected as a vehicle that transmits and receives power. It is to be noted that the upper limit threshold value corresponds to the second threshold value in the present disclosure.

Then, supplying discharge power of the energy storage 12 of each selected vehicle 10 to the power system 30 through the power transmission management apparatus 1, and supplying charge power of the energy storage 12 of each selected vehicle 10 to the energy storage 12 from the power system 30 through the power transmission management apparatus 1 are alternately repeated.

In this case, when power is transmitted from the power transmission management apparatus 1 to the power system 30, the total amount of discharge power supplied from the energy storage 12 of each selected vehicle 10 is supplied to the power transmission management apparatus 1. Also, when power is transmitted from the power system 30 to the power transmission management apparatus 1, the total amount of power received from the power system 30 by the power transmission management apparatus 1 is distributed and supplied to the energy storage 12 of each selected vehicle 10, and the energy storage 12 is charged.

Next, in a time period after the instantaneous reserved power transmission processing or the frequency adjustment processing is completed, the controller 3 of the power transmission management apparatus 1 performs processing for charging the energy storage 12 of each of the power utilization target vehicles 10 in cooperation with the controller 15 of each of the power utilization target vehicles 10.

In this case, from the power transmission management apparatus 1, charge power of other energy storages 12 is supplied to the power utilization target vehicles 10, in which the SOC (estimated value) of the energy storage 12 falls below a target SOC specified by the charge/discharge request, and the energy storage 12 is charged up to the target SOC.

In the charge processing, the power transmission management apparatus 1 supplies the power received from the power generation facilities 20 to the power utilization target vehicles 10 that charge relevant energy storages 12. Also, the charge power is supplied to the energy storages 12 of the power utilization target vehicles 10 in a time period which is specified by the utilization plan related to the power utilization target vehicles 10, and in which charge is completed until the next timing of start of use of the power utilization target vehicles 10, and in the time period (for instance, a time period at night), the cost per unit time of the power received from the power generation facilities 20 by the power transmission management apparatus 1 is the lowest.

In this embodiment, the payment cost imposed per unit charge amount of each energy storage 12 in the charge processing is set to be lower than the incentive per unit charge amount of each energy storage 12 in the instantaneous reserved power transmission processing.

It is to be noted that the charge processing for the energy storage 12 of each vehicle 10 other than the power utilization target vehicles 10 is performed similarly.

In this embodiment, as described above, the SOC variation reduction processing is performed in a time period before power transmission is performed between the power transmission management apparatus 1 and the power system 30 by the instantaneous reserved power transmission processing or the frequency adjustment processing. The SOC variation reduction processing reduces the degree of variation in the SOC of the energy storage 12 of each power utilization target vehicle 10.

For this reason, before the instantaneous reserved power transmission processing or the frequency adjustment processing is performed, the SOC of the energy storage 12 of each power utilization target vehicle 10 is likely to be an intermediate value not too close to 100% or 0%.

Here, when the SOC of an energy storage 12 is 100% or in a high SOC state near 100%, the energy storage 12 may not be substantially charged, and thus may not be used in the frequency adjustment processing.

Although an energy storage 12 in a high SOC state is usable as an energy storage that performs discharge in the instantaneous reserved power transmission processing, the discharge amount per unit time has to be lower than or equal to a predetermined value in order to protect against deterioration or overheating of the energy storage 12. For this reason, the total amount of discharge of the energy storage 12 (energy storage 12 in a high SOC state) in a time period in which the instantaneous reserved power transmission processing is performed is likely to be part of possible discharge amount. Eventually, the incentive obtainable by the user of a vehicle 10 equipped with the energy storage 12 is likely to be low.

Also, when the SOC of an energy storage 12 is 0% or in a low SOC state near 0%, the energy storage 12 may not be substantially discharged, and thus may not be used in both the instantaneous reserved power transmission processing and the frequency adjustment processing.

Therefore, when some energy storages 12 of multiple power utilization target vehicles 10, 10, . . . electrically connected to the power transmission management apparatus 1 are in a high SOC state or in a low SOC state, the number of energy storages 12 usable in the instantaneous reserved power transmission processing or the frequency adjustment processing is likely to be small.

Eventually, this tends to create a situation in which it is not possible to achieve a sufficiently large total amount of power which is transmittable between the power transmission management apparatus 1 and the power system 30, by utilizing the energy storages 12 of the vehicles 10. Also, there is a possibility that the total amount of power transmittable utilizing the energy storages 12 of the vehicles 10 falls below the amount of power based on a contract. Consequently, the profit obtainable by a business operator of the power transmission management apparatus 1 or the user of each vehicle 10 is likely to be small.

Furthermore, in general, when the energy storage 12 is left in a high SOC state or a low SOC state for a long time, deterioration of the energy storage 12 is likely to accelerate.

In this embodiment, as described above, before the instantaneous reserved power transmission processing or the frequency adjustment processing is performed, the SOC of the energy storage 12 of each of the power utilization target vehicles 10 is likely to be an intermediate value due to the SOC variation reduction processing. In other words, the energy storage 12 of each power utilization target vehicle 10 changes from a high SOC state or a low SOC state to an intermediate SOC state, or is maintained in an intermediate SOC state.

An example will be described with reference to FIG. 6. In this example, the number of power utilization target vehicles 10 that undergo the SOC variation reduction processing is, for instance, four, and the respective SOCs of the energy storages 12 at the start of the SOC variation reduction processing are 100%, 60%, 40%, and 0%. In this case, the standard deviation as the SOC variation degree index value is 36.0. Hereinafter, the vehicle 10 with a SOC of the energy storage 12 of 100% is denoted by a vehicle 10a, the vehicle 10 with a SOC of the energy storage 12 of 60% is denoted by a vehicle 10b, the vehicle 10 with a SOC of the energy storage 12 of 40% is denoted by a vehicle 10c, and the vehicle 10 with a SOC of the energy storage 12 of 0% is denoted by a vehicle 10d.

In the SOC variation reduction processing for these vehicles 10a to 10d, for instance, the vehicle 10a is selected as a discharge target vehicle 10 (one vehicle), and the vehicles 10c, 10d are each selected as a charge target vehicle 10 (two vehicles). It is to be noted that in this example, the vehicle 10b is not selected as a discharge subject vehicle 10 or a charge subject vehicle 10.

The energy storage 12 of the vehicle 10a as a discharge target vehicle 10 discharges electricity in an amount equivalent to 50% of the SOC, for instance, and the vehicles 10c, 10d as the charge target vehicles 10 are respectively charged with an amount of electricity (⅕ of the total amount of discharge of the energy storage 12 of the vehicle 10a) equivalent to 10% of the SOC, and an amount of electricity (⅘ of the total amount of discharge of the energy storage 12 of the vehicle 10a) equivalent to 40% of the SOC. It is to be noted that more particularly, an amount of electricity equivalent to X % of the SOC indicates an amount of electricity of X % of the full charge capacity (=the full charge capacity× X/100) of the energy storage 12.

As described above, the respective SOCs of the energy storages 12 of the vehicles 10a to 10d at the end of the SOC variation reduction processing become 50%, 60%, 50%, and 40% by discharging the energy storage 12 of the vehicle 10a and the energy storage 12 of each of the vehicles 10c, 10d. Therefore, the standard deviation as the SOC variation degree index value is decreased from 36.0 at the start of the SOC variation reduction processing to 7.1. Also, the SOC of the energy storage 12 of each of the vehicles 10a to 10d is in an intermediate SOC state.

In this manner, the degree of variation in the SOC of the energy storage 12 of each of the power utilization target vehicles 10 is basically reduced by the SOC variation reduction processing. Consequently, the SOC of the energy storage 12 of each of the power utilization target vehicles 10 is set to an approximately intermediate value.

Figure 6:
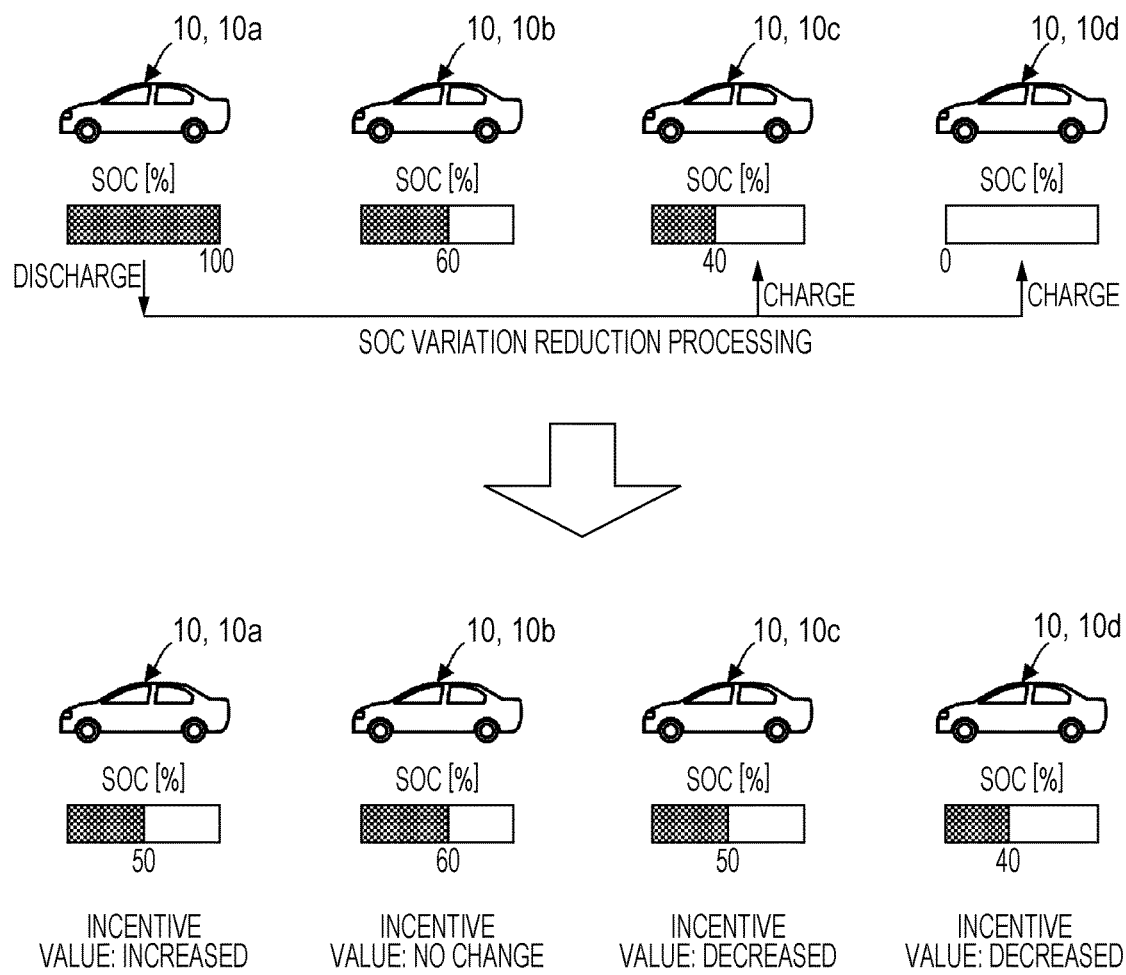
FIG. 6 is a diagram illustrating a change in the state of charge of the energy storages of multiple vehicles caused by the SOC variation reduction processing.

It is to be noted that in the example illustrated in FIG. 6, as a consequence of execution of the SOC variation reduction processing, the user of the vehicle 10a that discharges the energy storage 12 obtains an incentive (positive incentive) according to the amount of discharge of the energy storage 12 (the amount of decrease in SOC), and the users of the vehicles 10c, 10d that charge the respective energy storages 12 pay an incentive (negative incentive) according to the amount of charge of the respective energy storages 12 (the amount of increase in SOC).

As a supplement, in a situation in which the SOCs of the energy storages 12 of all power utilization target vehicles 10 are in a high SOC state or the SOCs of the energy storages 12 of all power utilization target vehicles 10 are in a low SOC state before the start of execution of the SOC variation reduction processing, it is not possible to change the SOCs of the energy storages 12 of the power utilization target vehicles 10 to an intermediate value by the SOC variation reduction processing. However, when the number of power utilization target vehicles 10 is sufficiently large, in general, the SOC of the energy storage 12 of each of the power utilization target vehicles 10 is distributed over various values between a high SOC state and a low SOC state (in general, a situation of partial distribution to only one side of a high SOC state side and a low SOC state side is unlikely to occur).

Therefore, in most cases, the SOC of the energy storage 12 of each of the power utilization target vehicles 10 is set to an approximately intermediate value by the SOC variation reduction processing.

In this embodiment, as described above, the SOC of the energy storage 12 of each of the power utilization target vehicles 10 is basically set to an approximately intermediate value by the SOC variation reduction processing. In this state, the energy storage 12 of each of all the power utilization target vehicles 10 is utilizable by the instantaneous reserved power transmission processing and the frequency adjustment processing.

Therefore, the power transmission management apparatus 1 can increase the amount of power transmittable between the power system 30 and the power transmission management apparatus 1 by the instantaneous reserved power transmission processing and the frequency adjustment processing. Eventually, the transmission of power can increase the profit obtained by a business operator of the power transmission management apparatus 1, as well as the incentive to the user of each vehicle 10 utilized by the instantaneous reserved power transmission processing and the frequency adjustment processing.

Particularly, in a vehicle 10 (for instance, the vehicle 10a illustrated in FIG. 6) in which the SOC of the energy storage 12 is in a high SOC state before the start of execution of the SOC variation reduction processing, it is possible to discharge much of the original amount of electricity (the amount of stored energy) of the energy storage 12 by the discharge of the energy storages 12 in the SOC variation reduction processing, and the discharge of the energy storage 12 in instantaneous reserved power transmission processing. Thus, the user of the vehicle 10 is allowed to obtain much incentive.

Also, a vehicle 10 (for instance, the vehicle 10d illustrated in FIG. 6) in which the SOC of the energy storage 12 is in a low SOC state before the start of execution of the SOC variation reduction processing is utilizable in the frequency adjustment processing or utilizable in both the frequency adjustment processing and the instantaneous reserved power transmission processing by the charge of the energy storages 12 in the SOC variation reduction processing.

Therefore, the user of the vehicle 10 is allowed to obtain an incentive so as to supplement a decrease in the incentive value for the charge of the energy storage 12 in the SOC variation reduction processing.

Furthermore, in a vehicle 10 in which the SOC of the energy storage 12 is in a high SOC state or in a low SOC state before the start of execution of the SOC variation reduction processing, the SOC of the energy storage 12 is changed to an intermediate SOC by the SOC variation reduction processing. Thus, the energy storage 12 is prohibited from being maintained at a high SOC state or a low SOC state for a long time. Consequently, acceleration of deterioration of the energy storage 12 can be suppressed.

Here, the incentive obtained by the user and the payment cost for each of the power utilizing target vehicles 10 will be described with reference to FIG. 7 and FIG. 8.

Figure 7:
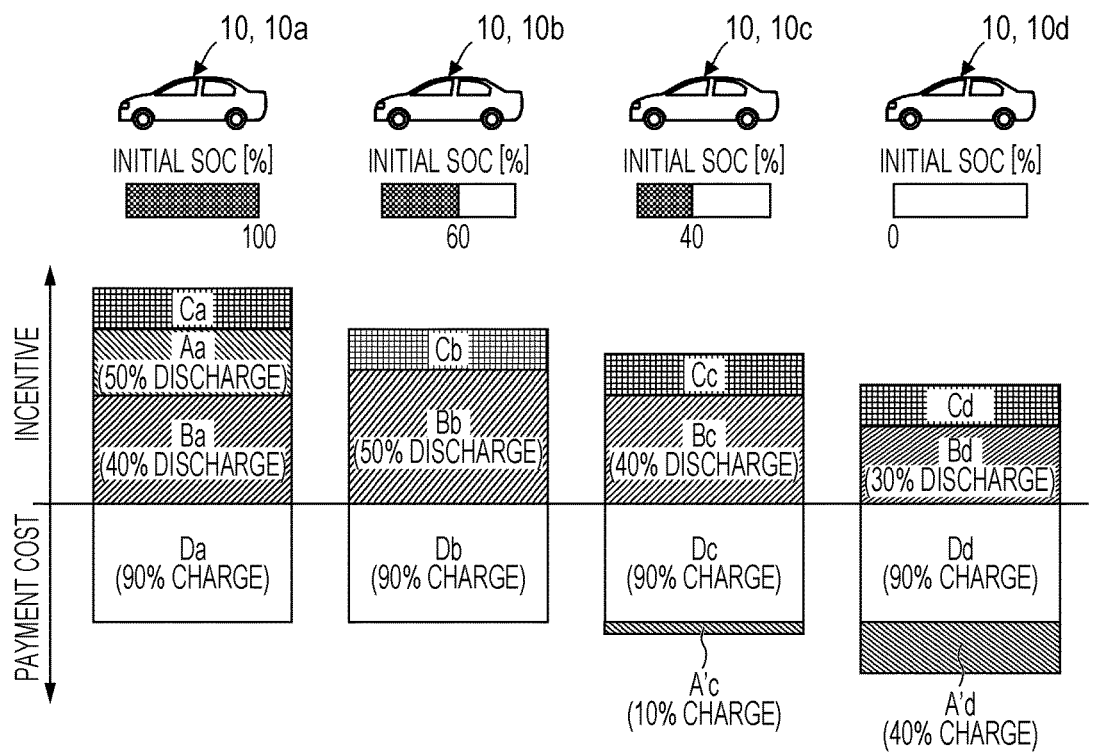
FIG. 7 is an explanatory diagram of incentive obtained by the users of vehicles in the embodiment.
Figure 8:
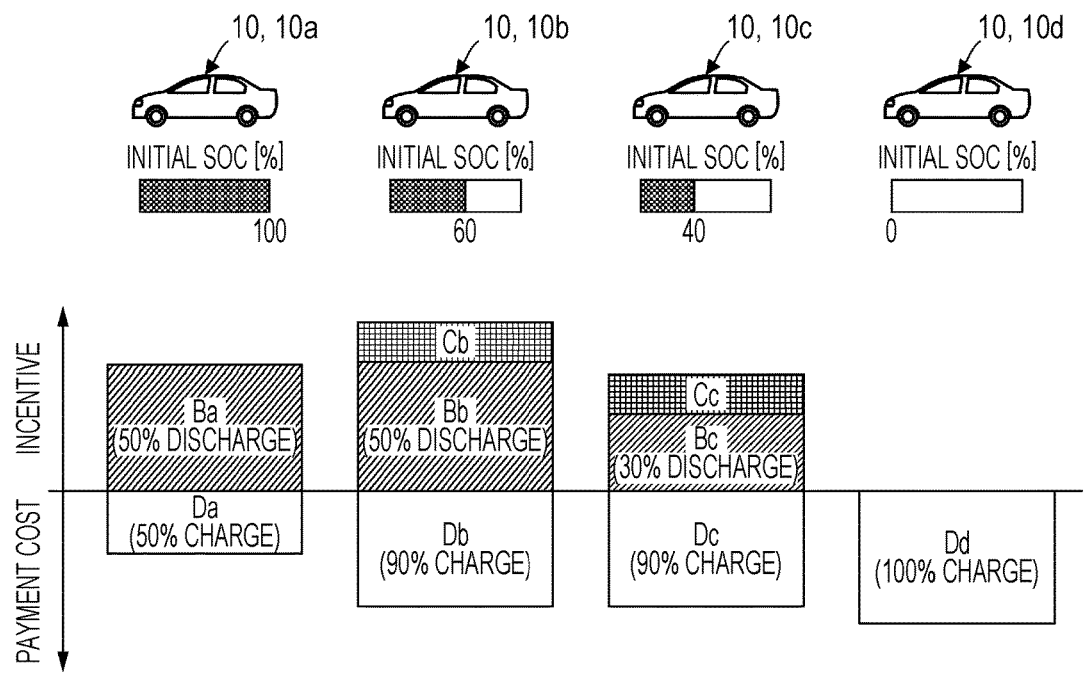
FIG. 8 is an explanatory diagram of incentive obtained by the users of vehicles in a comparative example.

FIG. 7 is a diagram illustrating an embodiment, and FIG. 8 is a diagram illustrating a comparative example. More particularly, FIG. 7 is a bar graph for four vehicles 10a to 10d (the vehicles 10a to 10d in which the original SOCs (initial SOCs) of the energy storages 12 are 100%, 60%, 40%, 0%, respectively) exemplified on the upper side of FIG. 6, the bar graph illustrating the incentive obtainable by each user by performing the SOC variation processing, the instantaneous reserved power transmission processing, and the frequency adjustment processing, and the payment cost for charge (charge up to a target SOC) of the energy storage 12 after those processing and operations.

Also, FIG. 8 is a bar graph for the four vehicles 10a to 10d illustrating the incentive obtainable by each user by performing the instantaneous reserved power transmission processing and the frequency adjustment processing without performing the SOC variation processing, and the payment cost for charge (charge up to a target SOC) of the energy storage 12 after those operations.

In these embodiment and comparative example, it is assumed that the final charge of the energy storage 12 of each of the vehicles 10a to 10d is performed with a target SOC of 100% of SOC. Also, a maximum value of total amount of possible discharge of each energy storage 12 in a time period in which the instantaneous reserved power transmission processing is performed is the amount of electricity equivalent to 50% of the SOC.

Also, it is assumed that before the final charge, each energy storage 12 is discharged to 10% of the SOC by the instantaneous reserved power transmission processing. In other words, it is assumed that the amount of charge of each energy storage 12 at the time of the final charge is the amount of electricity equivalent to 90% of the SOC for each of the vehicles 10a to 10d.

Also, it is assumed that the payment cost (incentive bearing) per unit charge amount of the energy storage 12 of each discharge target vehicle 10 in the SOC variation reduction processing is the same (or approximately the same) as the payment cost at the time of the final charge of the energy storage 12.

In the embodiment exemplified in FIG. 7, the user of the vehicle 10a in which the initial SOC of the energy storage 12 is 100% obtains, for instance, an incentive Aa (incentive according to an amount of discharge equivalent to 50% of the SOC) for discharge in the SOC variation reduction processing, an incentive Ba (incentive according to an amount of discharge equivalent to 40% of the SOC) for the instantaneous reserved power transmission processing, and an incentive Ca for the frequency adjustment processing, and bears payment cost Da (cost according to an amount of charge equivalent to 90% of the SOC) for the final charge of the energy storage 12.

Also, the user of the vehicle 10b in which the initial SOC of the energy storage 12 is 60% obtains, for instance, the incentive Ba (incentive according to an amount of discharge equivalent to 50% of the SOC) for the instantaneous reserved power transmission processing, and an incentive Cb for the frequency adjustment processing, and bears payment cost Db (=Da) for the final charge of the energy storage 12. It is to be noted that as illustrated in FIG. 6, the vehicle 10b is not selected as a discharge target vehicle 10 or a charge target vehicle 10 in the SOC variation reduction processing, and thus the user of the vehicle 10a does not obtain an incentive or bear payment cost for the SOC variation reduction processing.

Also, the user of the vehicle 10c in which the initial SOC of the energy storage 12 is 40% obtains, for instance, an incentive Bc (incentive according to an amount of discharge equivalent to 40% of the SOC) for the instantaneous reserved power transmission processing, and an incentive Cc for the frequency adjustment processing, and bears payment cost Dc (=Da) for the final charge of the energy storage 12, and payment cost A'c (payment cost according to an amount of charge equivalent to 10% of the SOC) for charge in the SOC variation reduction processing.

Also, the user of the vehicle 10d in which the initial SOC of the energy storage 12 is 0% obtains, for instance, an incentive Bd (incentive according to an amount of discharge equivalent to 30% of the SOC) for the instantaneous reserved power transmission processing, and an incentive Cd for the frequency adjustment processing, and bears charge cost Dd (=Da) for the final charge of the energy storage 12, and payment cost A'd (payment cost according to an amount of charge equivalent to 40% of the SOC) for charge in the SOC variation reduction processing.

It is to be noted that in the example of this embodiment, Aa=A'c+A'd.

In contrast, in the comparative example in which the SOC variation reduction processing is not performed, as exemplified in FIG. 8, the user of the vehicle 10a in which the initial SOC of the energy storage 12 is 100% obtains only the incentive Ba (incentive according to an amount of discharge equivalent to 50% of the SOC) for the instantaneous reserved power transmission processing, and bears payment cost Da (payment cost according to an amount of charge equivalent to 50% of the SOC) for the final charge of the energy storage 12.

It is to be noted that the energy storage 12 of the vehicle 10a is not utilizable in the frequency adjustment processing, and thus the user of the vehicle 10a is not allowed to obtain the incentive for the frequency adjustment processing.

Also, the user of the vehicle 10a in which the initial SOC of the energy storage 12 is 60% obtains, for instance, an incentive Bb (incentive according to an amount of discharge equivalent to 50% of the SOC) for the instantaneous reserved power transmission processing, and the incentive Cb for the frequency adjustment processing, and bears charge cost Db (payment cost according to an amount of charge equivalent to 90% of the SOC) for the final charge of the energy storage 12.

Also, the user of the vehicle 10c in which the initial SOC of the energy storage 12 is 40% obtains, for instance, the incentive Bc (incentive according to an amount of discharge equivalent to 30% of the SOC) for the instantaneous reserved power transmission processing, and the incentive Cc for the frequency adjustment processing, and bears payment cost Dc (payment cost according to an amount of charge equivalent to 90% of the SOC) for the final charge of the energy storage 12.

Also, the user of the vehicle 10d in which the initial SOC of the energy storage 12 is 0% obtains no incentive, and bears payment cost Dd for the final charge of the energy storage 12.

As seen from the comparison between FIG. 7 and FIG. 8, in the example illustrated in FIG. 7, each of the vehicles 10a to 10d is utilized in the instantaneous reserved power transmission processing and the frequency adjustment processing, and thus the user of each of the vehicles 10a to 10d is allowed to obtain an incentive for the instantaneous reserved power transmission processing and the frequency adjustment processing.

In contrast, in the comparative example illustrated in FIG. 8, the user of the vehicle 10a in which the initial SOC of the energy storage 12 is 100% is not allowed to obtain an incentive for the frequency adjustment processing, and the user of the vehicle 10d in which the initial SOC of the energy storage 12 is 0% is not allowed to obtain an incentive for the instantaneous reserved power transmission processing and the frequency adjustment processing.

In this case, although the vehicle 10a in the example has an increased payment cost Da for charge of the energy storage 12, as compared with the comparative example, the incentive Aa for discharge in the SOC variation reduction processing, and the incentive Ca for the frequency adjustment processing are obtainable. Therefore, the incentives Aa, Ca are obtainable so as to supplement an increase in the payment cost Da for charge of the energy storage 12.

Also, although the user of each of the vehicles 10c, 10d in the example has increased payment costs A'c, A'd for charge in the SOC variation reduction processing, as compared with the comparative example, the incentive for the instantaneous reserved power transmission processing and the frequency adjustment processing is increased. For this reason, the payment cost for the user of each of the vehicles 10c, 10d is reduced, as compared with the comparative example.

In the comparative example illustrated in FIG. 8, vehicles 10, in which the power of the energy storage 12 is usable by the power transmission management apparatus 1 in the instantaneous reserved power transmission processing, are three vehicles 10a to 10c, and the total amount of electricity which can be discharged from the energy storages 12 of the three vehicles in a time period of the instantaneous reserved power transmission processing is the amount of electricity equivalent to 130% of the SOC. Furthermore, in the comparative example, vehicles 10, which can repeat charge and discharge of the energy storage 12 in the frequency adjustment processing, are two vehicles 10b, 10c.

In contrast, in the example illustrated in FIG. 7, vehicles 10, in which the power of the energy storage 12 is usable by the power transmission management apparatus 1 in the instantaneous reserved power transmission processing, are four vehicles 10a to 10d, and the total amount of electricity which can be discharged from the energy storages 12 of the four vehicles in a time period of the instantaneous reserved power transmission processing is the amount of electricity equivalent to 170% of the SOC. Therefore, the total amount of electricity which can be discharged in a time period of the instantaneous reserved power transmission processing is increased.

Furthermore, in the comparative example, vehicles 10, which can repeat charge and discharge of the energy storage 12 in the frequency adjustment processing, are four vehicles 10a to 10d, and thus the total amount of electricity, which can be given and received between the power transmission management apparatus 1 and the power system 30 utilizing the power of the energy storage 12 in the frequency adjustment processing, is increased, as compared with the comparative example.

According to this embodiment that performs the SOC variation reduction processing in this manner, it is possible to increase the amount of power which can be transmitted from the power transmission management apparatus 1 to the power system 30 utilizing the power of the energy storage 12 of each vehicle 10 in the instantaneous reserved supply operation, and the amount of electricity which can be given and received between the power transmission management apparatus 1 and the power system 30 utilizing the power of the energy storage 12 of each vehicle 10 in the frequency adjustment processing.

Therefore, the profit obtained by a business operator of the power transmission management apparatus 1 can be increased. Eventually, a business operator of the power transmission management apparatus 1 can further reduce the unit price of payment cost (payment cost per unit charge amount) for charge of the energy storage 12 of each of the power utilizing target vehicles 10, or can further increase the unit price of incentive (incentive per unit charge amount) for discharge of the energy storage 12 of each of the power utilization target vehicle 10. Consequently, it is possible to further increase the incentive obtained by the user of each vehicle 10 and to further reduce the payment cost of the user.

It is to be noted that in the embodiment described above, in the SOC variation reduction processing, an increase in the incentive value per unit discharge amount of the energy storage 12 of each discharge target vehicle 10, and a decrease (bearing of cost) in the incentive value per unit charge amount of the energy storage 12 of each charge target vehicle 10 are set to the same value. However, for instance, an increase in the incentive value per unit discharge amount may be larger than a decrease in the incentive value per unit charge amount.

Furthermore, an increase in the incentive value per unit discharge amount of the energy storage 12 of each discharge target vehicle 10 in the SOC variation reduction processing may be larger than the incentive per unit charge amount of the energy storage 12 in the instantaneous reserved power transmission processing, for instance.

In this manner, the user of each discharge target vehicle 10 in the SOC variation reduction processing can obtain more incentive, and thus cost advantage can be improved. Eventually, it is possible to increase the number of vehicles 10 that participate in the system (V2G system) in this embodiment.

Consequently, it is possible to further increase the amount of power transmittable between the power transmission management apparatus 1 and the power system 30. Eventually, the profit obtainable by a business operator of the power transmission management apparatus 1 can be increased.

In the embodiment, a case where the transportation unit is the vehicle 10 has been described as an example. However, the transportation unit in the present disclosure may be other than the vehicle 10, for instance, a ship, a rail vehicle, or a component transporter vehicle in a production line.

In the embodiment, a case where the external energy storage is the energy storage 12 of the vehicle 10 has been described as an example. However, the external energy storage may be a stationary energy storage or the like.

An energy storage system of the present disclosure includes: an energy storage mounted in a transportation unit; a connector that is electrically connectable to an external power transmission management apparatus, and that, in a connected state, allows power transmission, via the power transmission management apparatus, between an external power system electrically connected to the power transmission management apparatus, and one or more external energy storages electrically connected to the power transmission management apparatus; a power transmission circuit interposed between the connector and the energy storage; a controller that has a function of controlling the power transmission circuit. The controller has a function that, in a state where the connector is electrically connected to the power transmission management apparatus, performs A control processing to control the power transmission circuit in accordance with a command issued from the power transmission management apparatus so that power transmission is performed between the energy storage and the power system, and a function that, when a degree of variation in states of charge of a plurality of energy storages including the energy storage and the one or more external energy storages is greater than or equal to a predetermined threshold value, performs B control processing to control the power transmission circuit before the A control processing is performed to reduce the degree of variation, in accordance with a command issued from the power transmission management apparatus so that power transmission is performed between the energy storage and the one or more external energy storages via the power transmission management apparatus (a first aspect of the disclosure).

It is to be noted that "an any object A (or facility A) is "electrically connected" to another object B (or facility B)" in the present disclosure indicates a state where power can be transmitted between A and B at any time (an electric line between A and B is formed). In this case, "electrical connection" between A and B is not limited to a connection state due to contact between conductors, and may be a connection state where power transmission between A and B is performed wirelessly (via electromagnetic wave energy).

As the external energy storage, for instance, an energy storage mounted in another transportation unit different from the transportation units may be adopted. However, the external energy storage may not be mounted in a transportation unit (the external energy storage may be, for instance, a stationary energy storage).

According to a first aspect of the disclosure, when a degree of variation in the states of charge of multiple energy storages including an energy storage (hereinafter may be referred to as a mounting energy storage) stationarily mounted in the transportation unit, and the external energy storages is greater than or equal to a predetermined threshold value, in short, when the degree of variation is large, the B control processing is performed before the A control processing is performed.

The degree of variation in the states of charge of the multiple energy storages is reduced by the B control processing. Consequently, the states of charge of the multiple energy storages are approximately the same or near values, and in an energy storage (a mounting energy storage or an external energy storage) having an excessively high state of charge, the excessively high state can be eliminated as much as possible, and in an energy storage (a mounting energy storage or an external energy storage) having an excessively low state of charge, the excessively low state can be eliminated as much as possible.

In this manner, the A control processing is performed in a state where the degree of variation in the states of charge of the multiple energy storages is reduced. In other words, the power transmission circuit is controlled so that power transmission is performed between the mounting energy storage and the power system.

In this case, since the degree of variation is reduced, all of the multiple energy storages or most of the energy storages can transmit power between the power system and the energy storages via the power transmission management apparatus. Eventually, the amount of power transmitted between the power transmission management apparatus and the power system can be stably ensured. In addition, charge and discharge of each of the energy storages can be controlled in the same manner.

Thus, with the energy storage system according to the first aspect of the disclosure, it is possible to stably perform power transmission between the external power system and multiple energy storages including the mounting energy storage and the one or more external energy storages without using complicated control.

Also, since an excessively high state or an excessively low state of the states of charge of multiple energy storages can be eliminated as much as possible by the second control processing, the energy storages are protected against being left with the states of charge in an excessively high state or an excessively low state for a long time. Consequently, acceleration of deterioration of each energy storage can be suppressed.

In the first aspect of the disclosure, the command issued from the power transmission management apparatus to the controller preferably includes one of a discharge command and a charge command, and when the discharge command is issued, the controller preferably controls the power transmission circuit so that the energy storage (mounting energy storage) is discharged, and when the charge command is issued, the controller preferably controls the power transmission circuit so that the energy storage (mounting energy storage) is charged (a second aspect of the disclosure).

According to this, discharge or charge of the mounting energy storage can be appropriately performed.

In the second aspect of the disclosure, the discharge command related to the A control processing is preferably issued to the controller under a precondition that the state of charge of the energy storage (mounting energy storage) is higher than or equal to a first predetermined threshold value (a third aspect of the disclosure).

According to this, when the state of charge of the mounting energy storage is low (lower than the first threshold value) after the B control processing is performed, the mounting energy storage is not discharged in the A control processing, and thus the mounting energy storage is protected against an excessively discharged state. Eventually, acceleration of deterioration of the mounting energy storage can be suppressed. Also, since the state of charge of the energy storage is ensured (protected against a low state of charge), the mileage of the transportation unit can be ensured. Therefore, convenience of the user of a transportation unit can be improved.

In the second or third aspect of the disclosure, the charge command related to the A control processing is preferably issued to the controller under a precondition that the state of charge of the energy storage (mounting energy storage) is lower than or equal to a second predetermined threshold value (a fourth aspect of the disclosure).

According to this, when the state of charge of the mounting energy storage is high (higher than the second threshold value) after the B control processing is performed, the mounting energy storage is not charged in the A control processing, and thus the mounting energy storage is protected against an excessively charged state. Eventually, acceleration of deterioration of the mounting energy storage can be suppressed.

It is to be noted that in the present disclosure, the B control processing is performed before the A control processing is performed, thus when the A control processing is performed, a situation, in which the state of charge of one of the mounting energy storage and the external energy storages is lower than the first threshold value or higher than the second threshold value, is unlikely to occur. Therefore, the amount of power transmitted between the power system and the energy storages can be sufficiently ensured by the entirety of multiple energy storages including the mounting energy storage.

In the first to fourth aspects of the disclosure, the controller preferably performs the B control processing that discharges the energy storage (mounting energy storage), in a state which allows power transmission from the energy storage (mounting energy storage) to two or more external energy storages (a fifth aspect of the disclosure).

According to this, the charge rate (charge amount per unit time) of the external energy storage that is charged by the B control processing can be reduced as much as possible. Thus, acceleration of deterioration of the external energy storage can be suppressed.

In the first to fifth aspects of the disclosure, the controller preferably performs the B control processing that charges the energy storage (mounting energy storage), in a state where a total number of external energy storages that are charged along with the energy storage (mounting energy storage), and the energy storage (mounting energy storage) out of the energy storage (mounting energy storage) and the external energy storages is greater than a number of the external energy storages that discharge energy (a sixth aspect of the disclosure).

According to this, the charge rate (charge amount per unit time) of the mounting energy storage that is charged by the B control processing can be reduced as much as possible. Thus, acceleration of deterioration of the mounting energy storage can be suppressed.

In the first to sixth aspects of the disclosure, the controller may have a function that, when the energy storage (mounting energy storage) is charged or discharged by the A control processing, obtains data indicating an increase in a cumulative incentive value from the power transmission management apparatus, and further has a function that informs of information on change in the incentive value (a seventh aspect of the disclosure).

According to this, when the mounting energy storage is charged or discharged by the A control processing, the incentive value is increased. Then, the user is informed of information on change in the incentive value. Thus, the user of the transportation unit can obtain an incentive by charging or discharging the energy storage in the A control processing, and can recognize a change in the incentive value (cumulative incentive value).

In the seventh aspect of the disclosure, the controller preferably has a function that, when the energy storage (mounting energy storage) is charged or discharged by the A control processing, obtains data indicating an increase in a cumulative incentive value from the power transmission management apparatus, and further has a function that informs of information on change in the incentive value (an eighth aspect of the disclosure).

According to this, when the mounting energy storage is discharged by the B control processing, the user of the transportation unit can obtain further incentive, and can recognize a change in the incentive value.

In the eighth aspect of the disclosure, the controller may further have a function that, when the energy storage (mounting energy storage) is charged by the B control processing, obtains data indicating a decrease in the incentive value from the power transmission management apparatus (a ninth aspect of the disclosure).

According to this, when the mounting energy storage is discharged by the B control processing, the incentive value of the user of the transportation unit is decreased. It is possible to give the decrease to the user of the external energy storage as an incentive. Thus, a business operator of the power transmission management apparatus can eliminate or reduce bearing of cost in the second control processing.

In the eighth or ninth aspect of the disclosure, a configuration may be adopted in which an increase in the incentive value per unit discharge amount of the energy storage (mounting energy storage) when the energy storage (mounting energy storage) is discharged by the B control processing is greater than an increase in the incentive value per unit discharge amount of the energy storage (mounting energy storage) when the energy storage (mounting energy storage) is discharged by the A control processing (a tenth aspect of the disclosure).

According to this, when the mounting energy storage is discharged by the second control processing, the user of the transportation unit can obtain much incentive. Therefore, discharging the mounting energy storage by the second control processing has an advantage in cost. Eventually, the user of each of many transportation units makes an active effort to electrically connect the energy storage of the transportation unit to the power transmission management apparatus. Consequently, the profit obtainable by a business operator of the power transmission management apparatus for power transmission between the power system and the power transmission management apparatus is further increased, and the incentive obtainable by the user of each transportation unit is further increased.

Also, the transportation unit in the present disclosure includes the energy storage system according to the first to tenth aspects of the disclosure (11th aspect of the disclosure).

According to this, the same effect as that of the first to tenth aspects of the disclosure can be achieved.

A method of controlling an energy storage system in the present disclosure including: an energy storage mounted in a transportation unit, a connector that is electrically connectable to an external power transmission management apparatus, and that, in a connected state, allows power transmission, via the power transmission management apparatus, between an external power system electrically connected to the power transmission management apparatus, and one or more external energy storages electrically connected to the power transmission management apparatus, and a power transmission circuit interposed between the connector and the energy storage, the method including: in a state where the connector is electrically connected to the power transmission management apparatus, controlling the power transmission circuit to perform power transmission between the energy storage and the power system, and when a degree of variation in states of charge of a plurality of energy storages including the energy storage and the one or more external energy storages is greater than or equal to a predetermined threshold value, to reduce the degree of variation before the controlling the power transmission circuit, controlling the power transmission circuit to perform power transmission between the energy storage and the one or more external energy storages via the power transmission management apparatus (12th aspect of the disclosure).

According to this, the same effect as that of the first aspect of the disclosure can be achieved.

Obviously, numerous modifications and variations of the present invention are possible in light of the above teachings. It is therefore to be understood that within the scope of the appended claims, the invention may be practiced otherwise than as specifically described herein.

What is claimed is:
1. An energy storage system comprising:
an energy storage mounted in a transportation unit;
a connector that is electrically connectable to an external power transmission management apparatus, and that, in a connected state, allows power transmission, via the power transmission management apparatus, between an external power system electrically connected to the power transmission management apparatus, and one or more external energy storages electrically connected to the power transmission management apparatus;
a power transmission circuit interposed between the connector and the energy storage;
a controller that has a function of controlling the power transmission circuit,
wherein the controller has
a function that, in a state where the connector is electrically connected to the power transmission management apparatus, performs A control processing to control the power transmission circuit in accordance with a command issued from the power transmission management apparatus so that power transmission is performed between the energy storage and the power system, and
a function that, when a degree of variation in states of charge of a plurality of energy storages including the energy storage and the one or more external energy storages is greater than or equal to a predetermined threshold value, performs B control processing to control the power transmission circuit before the A control processing is performed to reduce the degree of variation, in accordance with a command issued from the power transmission management apparatus so that power transmission is performed between the energy storage and the one or more external energy storages via the power transmission management apparatus.

2. The energy storage system according to claim 1, wherein the command issued from the power transmission management apparatus to the controller includes one of a discharge command and a charge command, and when the discharge command is issued, the controller controls the power transmission circuit so that the energy storage is discharged, and when the charge command is issued, the controller controls the power transmission circuit so that the energy storage is charged.

3. The energy storage system according to claim 2, wherein the discharge command related to the A control processing is issued to the controller under a precondition that the state of charge of the energy storage is higher than or equal to a first predetermined threshold value.

4. The energy storage system according to claim 2, wherein the charge command related to the A control processing is issued to the controller under a precondition that the state of charge of the energy storage is lower than or equal to a second predetermined threshold value.

5. The energy storage system according to claim 1, wherein the controller performs the B control processing that discharges the energy storage, in a state which allows power transmission from the energy storage to two or more external energy storages.

6. The energy storage system according to claim 1, wherein the controller performs the B control processing that charges the energy storage, in a state where a total number of external energy storages that are charged along with the energy storage, and the energy storage out of the energy storage and the external energy storages is greater than a number of the external energy storages that discharge energy.

7. The energy storage system according to claim 1, wherein the controller has a function that, when the energy storage is charged or discharged by the A control processing, obtains data indicating an increase in a cumulative incentive value from the power transmission management apparatus, and further has a function that informs of information on change in the incentive value.

8. The energy storage system according to claim 7, wherein the controller further has a function that, when the energy storage is discharged by the B control processing, obtains data indicating an increase in the incentive value from the power transmission management apparatus.

9. The energy storage system according to claim 8, wherein the controller further has a function that, when the energy storage is charged by the B control processing, obtains data indicating a decrease in the incentive value from the power transmission management apparatus.

10. The energy storage system according to claim 8, wherein an increase in the incentive value per unit discharge amount of the energy storage when the energy storage is discharged by the B control processing is greater than an increase in the incentive value per unit discharge amount of the energy storage when the energy storage is discharged by the A control processing.

11. A transportation unit including the energy storage system according to claim 1.

12. A method of controlling an energy storage system including:
an energy storage mounted in a transportation unit,
a connector that is electrically connectable to an external power transmission management apparatus, and that, in a connected state, allows power transmission, via the power transmission management apparatus, between an external power system electrically connected to the power transmission management apparatus, and one or more external energy storages electrically connected to the power transmission management apparatus, and
a power transmission circuit interposed between the connector and the energy storage, the method comprising:
in a state where the connector is electrically connected to the power transmission management apparatus, controlling the power transmission circuit to perform power transmission between the energy storage and the power system, and
when a degree of variation in states of charge of a plurality of energy storages including the energy storage and the one or more external energy storages is greater than or equal to a predetermined threshold value, to reduce the degree of variation before the controlling the power transmission circuit, controlling the power transmission circuit to perform power transmission between the energy storage and the one or more external energy storages via the power transmission management apparatus.

13. An energy storage system comprising:
an energy storage provided in a transportation unit;
a connector electrically connectable to an external power transmission management apparatus that is electrically connectable to an external power system and one or more external energy storages;
a power transmission circuit interposed between the connector and the energy storage; and
a processor configured to
control the power transmission circuit in accordance with an output from the external power transmission management apparatus to perform power transmission between the energy storage and the external power system, and
control the power transmission circuit in accordance with an output from the external power transmission management apparatus, if a degree of variation in charging states in the energy storage and the one or more external energy storages is greater than or equal to a threshold value, to perform power transmission between the energy storage and the one or more external energy storages via the external power transmission management apparatus to reduce the degree of variation before performing the power transmission between the energy storage and the external power system.

14. The energy storage system according to claim 13, wherein the output from the power transmission management apparatus to the processor includes one of a discharge command and a charge command, and if the discharge command is issued, the processor controls the power transmission circuit so that the energy storage is discharged, and if the charge command is issued, the processor controls the power transmission circuit so that the energy storage is charged.

15. The energy storage system according to claim 14, wherein the discharge command related to the power transmission between the energy storage and the external power system is issued to the processor under a precondition that the state of charge of the energy storage is higher than or equal to a first threshold value.

16. The energy storage system according to claim 14, wherein the charge command related to the power transmission between the energy storage and the external power system is issued to the processor under a precondition that the state of charge of the energy storage is lower than or equal to a second threshold value.

17. The energy storage system according to claim 13,
wherein the processor is configured to perform the power transmission between the energy storage and the one or more external energy storages to discharge the energy storage, in a state where power transmission is to be performed from the energy storage to two or more external energy storages.

18. The energy storage system according to claim 13,
wherein the processor is configured to perform the power transmission between the energy storage and the one or more external energy storages to charge the energy storage, in a state where a total number of external energy storages that are charged along with the energy storage, and the energy storage out of the energy storage and the external energy storages is greater than a number of the external energy storages that discharge energy.

19. The energy storage system according to claim 13,
wherein the processor is configured to, if the energy storage is charged or discharged by the power transmission between the energy storage and the external power system, obtain data indicating an increase in a cumulative incentive value from the power transmission management apparatus, and inform of information on change in the incentive value.

20. The energy storage system according to claim 19,
wherein the processor is further configured to, if the energy storage is discharged by the power transmission between the energy storage and the one or more external energy storages, obtain data indicating an increase in the incentive value from the power transmission management apparatus.

21. The energy storage system according to claim 20,
wherein the processor is further configured to, if the energy storage is charged by the power transmission between the energy storage and the one or more external energy storages, obtain data indicating a decrease in the incentive value from the power transmission management apparatus.

22. The energy storage system according to claim 20,
wherein an increase in the incentive value per unit discharge amount of the energy storage if the energy storage is discharged by the power transmission between the energy storage and the one or more external energy storages is greater than an increase in the incentive value per unit discharge amount of the energy storage when the energy storage is discharged by the power transmission between the energy storage and the external power system.

23. A transportation unit including the energy storage system according to claim 13.

24. A method of controlling an energy storage system, the method comprising:
controlling a power transmission circuit to perform power transmission between an energy storage and an external power system, the energy storage system including the energy storage provided in a transportation unit, the connector electrically connectable to the external power transmission management apparatus that is electrically connectable to the external power system and one or more external energy storages, and the power transmission circuit interposed between the connector and the energy storage; and
if a degree of variation in states of charge of the energy storage and the one or more external energy storages is greater than or equal to a threshold value, controlling the power transmission circuit to perform power transmission between the energy storage and the one or more external energy storages via the power transmission management apparatus to reduce the degree of variation before performing the power transmission between the energy storage and the external power system.

* * * * *